United States Patent
Kerr

(10) Patent No.: US 11,023,110 B2
(45) Date of Patent: Jun. 1, 2021

(54) CREATING AN AXIS FOR DATA-BOUND OBJECTS

(71) Applicant: ADOBE INC., San Jose, CA (US)

(72) Inventor: Bernard James Kerr, Sausalito, CA (US)

(73) Assignee: ADOBE INC., San Jose, CA (US)

( * ) Notice: Subject to any disclaimer, the term of this patent is extended or adjusted under 35 U.S.C. 154(b) by 107 days.

(21) Appl. No.: 15/783,478

(22) Filed: Oct. 13, 2017

(65) Prior Publication Data

US 2019/0114055 A1    Apr. 18, 2019

(51) Int. Cl.
*G06F 3/0484*    (2013.01)
*G06T 11/60*    (2006.01)
*G06T 11/20*    (2006.01)
*G06F 40/18*    (2020.01)

(52) U.S. Cl.
CPC ........ *G06F 3/04842* (2013.01); *G06F 3/0484* (2013.01); *G06F 3/04845* (2013.01); *G06F 3/04847* (2013.01); *G06T 11/206* (2013.01); *G06T 11/60* (2013.01); *G06F 40/18* (2020.01); *G06T 2200/24* (2013.01)

(58) Field of Classification Search
CPC ....... G06T 1/206; G06T 11/246; G06T 11/60; G06F 3/0486; G06F 17/30958; G06F 3/04845; G06F 3/0484; G06F 3/04847
See application file for complete search history.

(56) References Cited

U.S. PATENT DOCUMENTS

| 5,581,677 A * | 12/1996 | Myers ................... G06T 11/206 345/440 |
| 6,188,403 B1 * | 2/2001 | Sacerdoti .............. G06T 11/206 715/764 |
| 7,222,308 B2 * | 5/2007 | Sauermann ......... G06F 3/04845 345/440 |
| 2004/0152053 A1 * | 8/2004 | Bardige ................... G09B 5/00 434/118 |

(Continued)

OTHER PUBLICATIONS

Hang, Erika. "Adobe Illustrator: Creating Chart," published Feb. 10, 2016, downloaded from http://www.annenbergdl.org/tutorials/adobe-illustrator-creating-charts/, published Feb. 10, 2016 (Year: 2016).*

(Continued)

*Primary Examiner* — Eric J Yoon
(74) *Attorney, Agent, or Firm* — Shook, Hardy & Bacon, LLP

(57) ABSTRACT

Computer-readable media, methods, and systems are provided for creating an axis control for adjusting graphic objects with one or more visual properties bound to data. One or more graphic objects are displayed on a graphic user interface, and a visual property of the graphic object relating to size or position is selected to be associated with a data value. An association is created between the visual property and the data, and a new coordinate system for the object is created based on the data value associated with the property. An axis control is then generated as a representation of the new coordinate system. Adjustments to the size or position of the axis control automatically result in a proportional change in the property values of any displayed graphic object subject to the association.

19 Claims, 29 Drawing Sheets

(56) References Cited

U.S. PATENT DOCUMENTS

2010/0058250 A1* 3/2010 Stannard ................ G06F 17/24
                                                    715/856

OTHER PUBLICATIONS

R. Moore, "The Building Blocks of UI Design with Adobe Illustrator," published Aug. 23, 2012, downloaded from https://www.adobepress.com/articles/article.asp?p=1929168&seqNum=5 (Year: 2012).*
Aisch, "Take Care of your Choropleth Maps" (pub. Dec. 1, 2011) https://www.vis4.netiblog/2011/12/choropleth-maps/ (last accessed Feb. 2, 2018), 7 pages.
Vimeo, "Drawing Dynamic Visualizations", video, (pub. May 2013, 2013) https://vimeo.com/66085662 (last accessed Feb. 2, 2018), 19 pages.
"Apparatus" (pub. before May 2017) http://aprt.us/ (last accessed Feb. 2, 2018), 6 pages.
Satyanarayan et al., "Lyra" (pub. Oct. 20, 2014) http://idl.cs.washington.edu/projects/lyra/ (last accessed Feb. 2, 2018), 4 pages.
Schwarz, "What is Adobe XD" (pub. Mar. 16, 2016) https://www.sitepoint.com/what-is-adobe-xd-or-project-comet-and-should-you-care/ (last accessed Feb. 2, 2018), 16 pages.

* cited by examiner

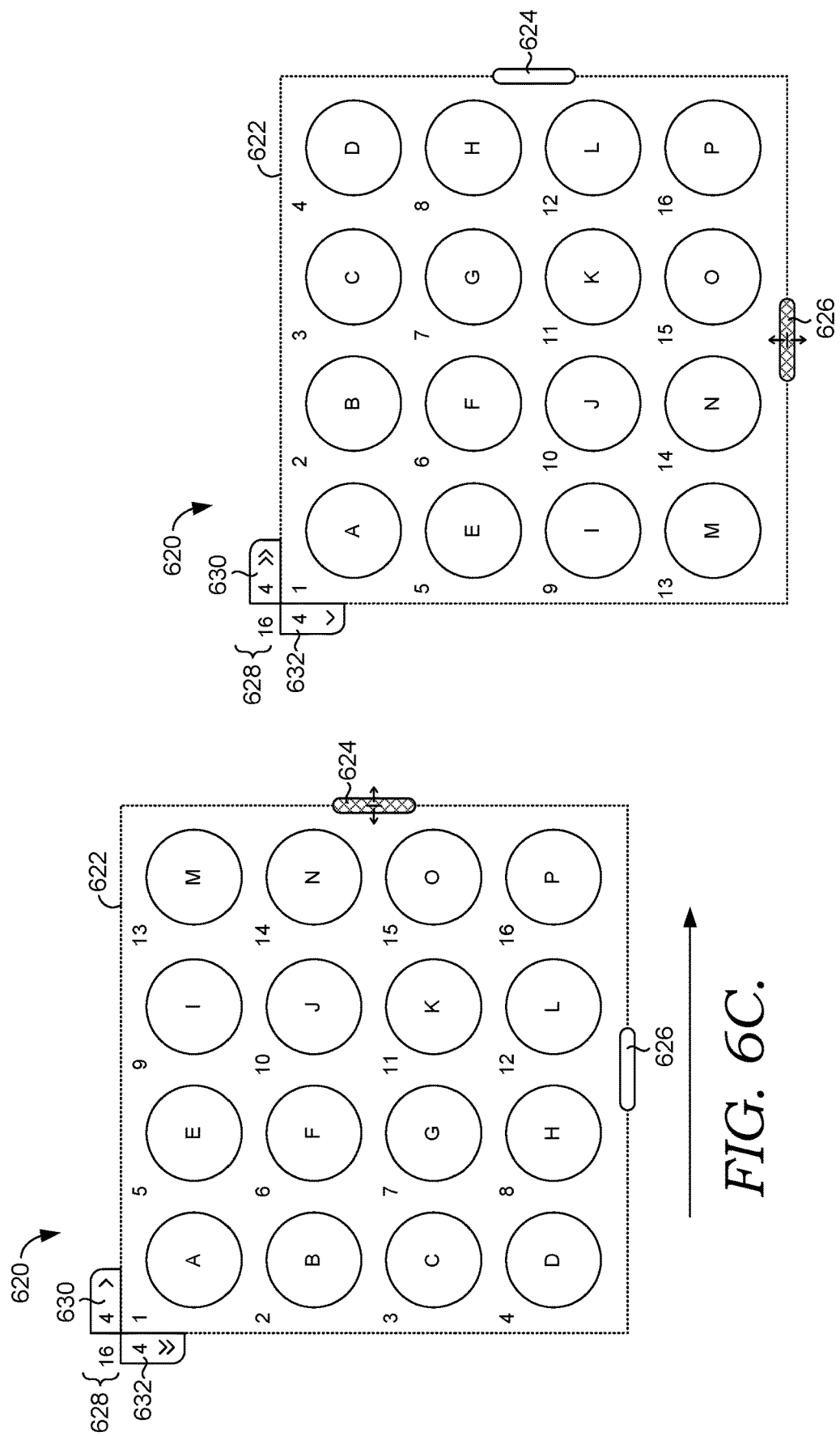

FIG. 9D.

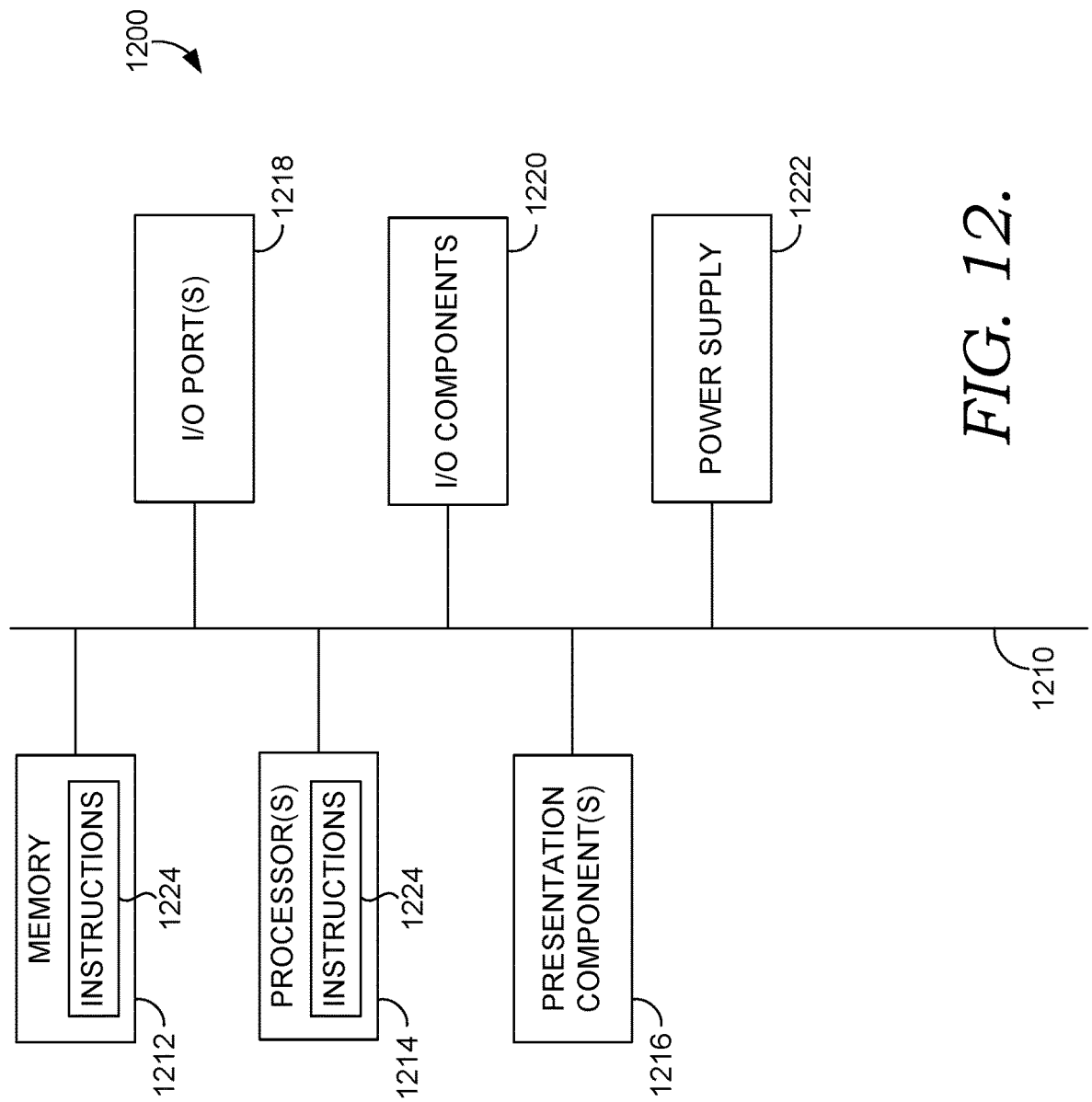

CREATING AN AXIS FOR DATA-BOUND OBJECTS

BACKGROUND

Data visualizations, such as charts for example, visually communicate information through schematic representations of data. The workflow for creating a visualization may be a complex and iterative process as it often involves alternating between data manipulation and the visual design aspects. Traditional methods of creating data visualizations include using a visualization template, manually drawing the visualization, or writing computer code to build a unique data visualization. These methods have limitations, however. For instance, template tools are often too rigid and do not provide a digital designer the flexibility to express his or her creativity. Conversely, manually drawing, which provides a lot of flexibility, may be a slow and sometimes inaccurate. Further, coding requires knowledge of a particular coding language and can be difficult to designers without programming expertise.

SUMMARY

Embodiments of the present invention are directed towards creating an axis control for graphic objects with one or more visual properties bound to data. One or more graphic objects are displayed on a graphic user interface, and a visual property of the graphic object relating to size or position is selected to be associated with a data variable or data value corresponding to a variable. The data variable is identified from a data set that comprises a number of observations with variable values. An association is created between the visual property and the variable such that a property value for the visual property for the graphic object is determined based on a corresponding variable value in the data set. An axis control is generated based on the association and identifies at least the variable value corresponding to the displayed graphic object. In exemplary aspects, the axis control is generated to represent a secondary coordinate system that is based on data values bound to the visual property and that has an origin point defined by the position of the graphic object.

When the axis control is presented for display on the graphic user interface, a user may adjust the size or position of the axis control, which automatically results in the property value of the graphic object being proportionately adjusted. Where there are multiple graphic objects displayed and subject to the association between the visual property and the variable, adjustment of the axis control adjusts all graphic objects to scale.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 6A-F depicts an example display area of a graphical user interface having multiple data-bound objects presented in various display patterns, in accordance with various embodiments of the present disclosure;

FIGS. 9A-D depict an example graphical user interface environment with an axis control for adjusting multiple data-bound graphic objects, in accordance with various embodiments of the present disclosure;

FIG. 12 depicts a block diagram of an example operating device in which embodiments of the present disclosure may be employed.

DETAILED DESCRIPTION

Figure 1:
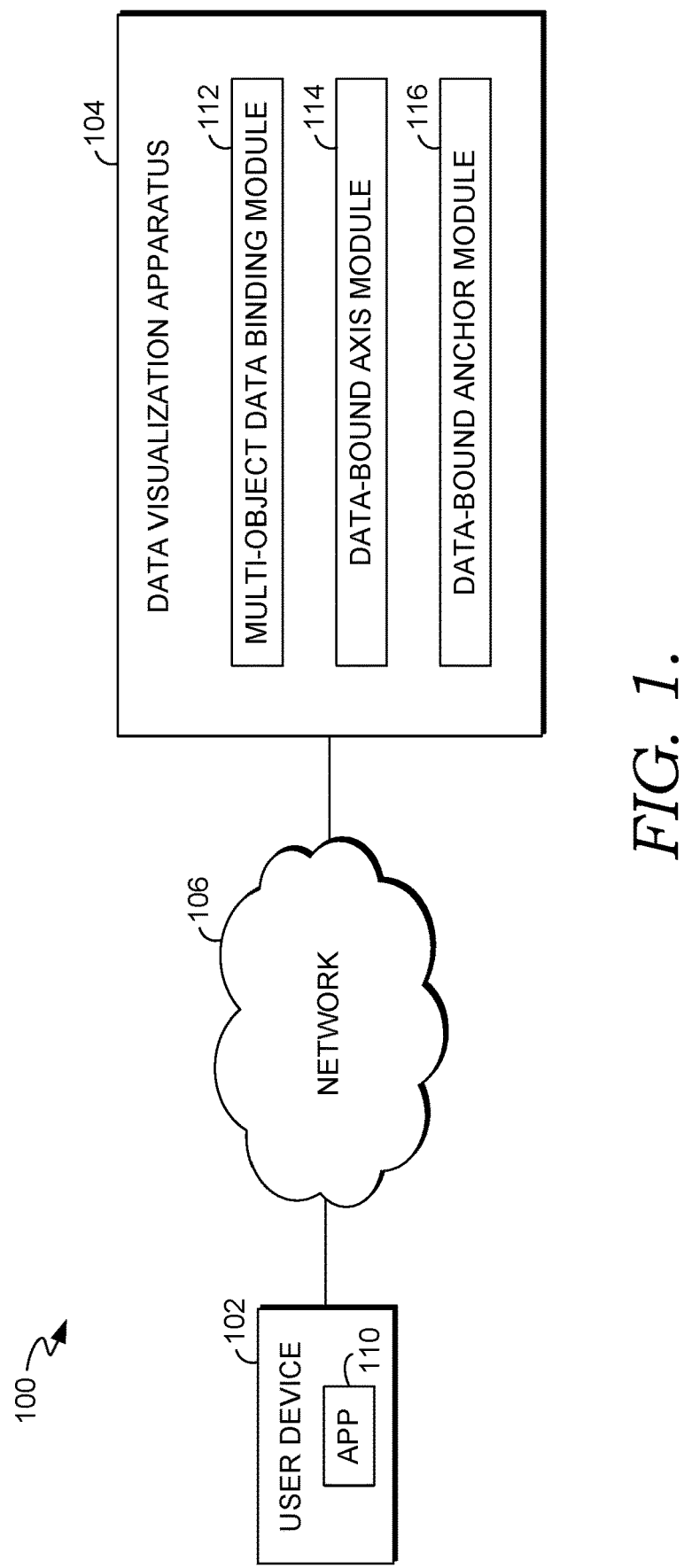
FIG. 1 depicts an example configuration of an environment in which some implementations of the present disclosure can be employed, in accordance with various embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed towards creating an axis control for graphic objects with one or more visual properties bound to data. Data-driven designs include data visualizations, such as charts and infographics, that are created to visually communicate information through schematic representations of data and/or statistics. A goal of data visualization is often to not only present information clearly and efficiently but to do so in a creative manner. The workflow for creating a visualization may be a complex and iterative process as it may involve alternating between data manipulation and the visual design aspects. Traditional methods of creating data visualizations include using a template-based tool such as Microsoft Excel®, manually drawing the visualization with a digital illustration application, such as Adobe Illustrator®, or writing computer code to build a unique data visualization. These methods, however, have limitations.

Template tools, for instance, are often too rigid and do not provide a digital designer the flexibility to express his or her creativity. With templates, graphics are applied to existing data; however, because designers typically consider the overall appearance of a visualization before using the data, designers often prefer to apply data to existing graphics. Conversely, drawing data visualizations gives a lot of flexibility, but it is a slow process to compute how the data applies to the graphics and to individually create objects for each data observation. Drawing is also more likely to lead to inaccuracies in representations of the data. Further, coding requires knowledge of a particular coding language, such as Processing or D3, and can be difficult to use without programming expertise. Designers sometimes merge templates and drawings by using a template to initially create a visualization and then manually adjusting the visualization into a desired form, which involves breaking the links between the data and the visualization. Creating data visualizations, however, often involves cycling back and forth from manipulating the data and the visual design aspects, and when links between the data and the visualization are broken, the designer must start the process from the beginning any time the data is modified or the designer wants to change the visual aspect represented by the data.

Embodiments of the present disclosure relate to tools addressing these limitations and facilitate creating data-driven designs by binding data to visual properties of an existing graphic. Specifically, one or more graphic objects untethered to data are initially created, and then any combination of the visual properties of the objects, such as position, scale/size, or color, is bound to data variables. As used herein, "graphic object" refers to an image or representation of an object capable of being displayed on a graphical user interface of a computing device. By way of illustration, a graphic object may be, among others, a geometric shape, an icon, a picture, or a text box. The data bound to the graphic objects may be used to determine the specific values for the visual properties of the objects, and when the data is modified, the values for the visual properties may automatically be updated to reflect the change in the data.

In this way, embodiments of the present disclosure provide advantages over traditional methods of creating data-driven designs. A user can first create graphic objects to determine the desired visual effect and then apply data to the objects that are of the user's own design. Additionally, creating digital designs through data-bound objects is quicker and more accurate than manual drawing. Direct manipulation of the graphic object also allows a data binding to be changed to different properties and the visualization to be easily updated with different data, which cannot easily happen with template-based tools or coding processes. In this way, a user can experiment with different visual features and/or data such that changes may be easily reversed if desired.

Specifically, embodiments of the disclosure relate to systems, methods, and computer-readable media for creating an axis control for adjusting graphic objects with one or more visual properties bound to data. One or more graphic objects are displayed on a graphic user interface, and a visual property of the graphic object relating to size or position is selected to be associated with a data variable or data values associated with variable. The data variable is identified from a data set received that comprises a number of observations with data values, which are also referred to herein as variable values. An association is created between the visual property and the variable such that a property value for the visual property for the graphic object is determined based on a corresponding variable value in the data set.

An axis control is generated based on the association and identifies at least the variable value corresponding to the displayed graphic object. In exemplary aspects, the axis control is generated as a representation of a new, secondary coordinate system created for the displayed graphic object. The origin point of the new coordinate system may be aligned with an existing portion of the graphic object and the values of the new coordinate system may be determined by data values for a variable bound to a property of the object. Property values for the position and dimension properties of the graphic object may be defined in terms of both the primary default coordinate system that applies to an entire canvas on which the graphic object is displayed and the secondary coordinate system created for the graphic object.

When the axis control is presented for display on the graphic user interface, the size or position of the axis control can be adjusted by, for example, dragging a portion of the axis control on the graphic user interface. Adjustment of the axis control automatically modifies any graphic object subject to the same association between the visual property and data on which the axis is based. The property values of the graphic object defined by the default coordinate system are adjusted to scale while the property values within the secondary coordinate system remain the same. In this way, the size and/or position of the graphic objects change within the graphic user interface but the objects still convey the same data relative to each other. In this way, binding a visual property of objects to a variable creates a fixed proportional relationship between visual properties of objects, and the axis control allows the scale of the objects to be adjusted without disrupting the relationship to the data.

Example Computing Environment

Turning to FIG. 1, an example configuration of an environment in which some implementations of the present disclosure can be employed to create data-bound objects for data data-driven designs and, specifically, for creating multiple data-bound graphic objects from an existing graphic object. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 12.

System 100 shown in FIG. 1 is an example of one suitable operating environment. Among other components not shown, system 100 comprises a user device 102 capable of interacting with a data visualization apparatus 104 to generate visualizations and other data-driven designs using graphic objects having attributes bound to data. Each of user device 102 and data visualization apparatus 104 shown in FIG. 1 may be provided via any type of computing device, such as one or more of computing device 1200 described in connection to FIG. 12, for example. These components may communicate with each other via network 106, which may be wired, wireless, or both. Network 106 may include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 106 is not described in significant detail.

It should be understood that any number of user devices and data visualization apparatuses may be employed within environment 100 within the scope of the present disclosure. Each may comprise a single device or multiple devices cooperating in a distributed environment. For instance, the data visualization apparatus 104 may be provided by multiple server devices collectively providing the functionality of the data visualization apparatus 104 as described above. Further, there may be multiple user devices each communicating with the data visualization apparatus 104. Additionally, other components not shown may be included within the environment 100.

A user employs user device 102 to interact with the data visualization apparatus 104 to generate and modify data-driven designs with graphic objects bound to a user's selected data set. User device 102 may be any type of computing device capable of being operated by a user. For example, in some implementations, user device 102 is the type of computing device described in relation to FIG. 12. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

User device 102 may include one or more processors and one or more computer-readable media having computer-readable instructions executable by the one or more processors. The instructions may be embodied by one or more applications, such as application 110 shown in FIG. 1. Application 110 is referred to as a single application for simplicity, but its functionality can be embodied by one or more applications in practice. Application 110 may generally be any application capable of facilitating the exchange of information between user device 102 and the data visualization apparatus 104 in carrying out one or more functions of the data visualization apparatus 104. In some implementations, application 110 comprises a web application that can run in a web browser and could be hosted at least partially on the server-side of environment 100. In addition, or instead, application 110 may comprise a dedicated application for interacting with the data visualization apparatus 104. In some cases, application 110 is integrated into the operating system (e.g., as a service). It is therefore contemplated herein that "application" be interpreted broadly.

The data visualization apparatus 104 may be implemented using one or more server devices, one or more platforms with corresponding application programming interfaces, cloud infrastructure, and the like. The data visualization apparatus 104 comprises a multi-object data binding module 112, a data-bound axis module 114, and a data-bound anchor module 116. While FIG. 1 illustrates a configuration in which the data visualization apparatus 104 is provided on a device separate from the user device 102 via a networked environment, it should be understood that in further configurations, the data visualization apparatus 104 or one or more components thereof can be provided as a local application on the user device 102.

In accordance with embodiments herein, data visualization apparatus 104 can facilitate binding data to graphic objects and/or provide additional tools for producing data-driven designs, such as data visualizations, using data-bound objects. Binding graphic objects to data comprises associating a visual property, such as color, size, position, rotation, stroke size, transparency, text content, and font style, of the graphic object to a data variable represented in a provided data set. The data value for the associated variable is used to determine the value of the visual property of the object. Even after the graphic object is rendered in accordance with the determined value of the visual property, the association between the variable and the visual property is stored and maintained such that the value of the visual property can be updated to reflect any changes to the variable data.

In some instances, data visualization apparatus 104 may bind the visual property of a single graphic object to a single data value. The multi-object data binding module 112 of data visualization apparatus 104 may also bind the visual property of multiple graphic objects to a data variable such that the visual property of each object reflects a data value of an observation of the variable. In this way, data for a particular variable may be used to set visual property values for a set of similar graphic objects to efficiently create a data visualization. The layout of the set of objects being displayed may be based on the data itself, and specifically, the order of the variable data may determine the order of the graphic objects. Further, the layout is determined or can be modified by a user's interactions with a graphical user interface while the graphic objects remain bound to the data.

Embodiments of data visualization apparatus 104 also comprise a data-bound axis module 114 that creates an axis for adjusting the scale of the graphic objects using a new coordinate system based on the variable data associated with the object. The data-bound axis control is presented on the graphical user interface, and a user may interact with the axis control to adjust the coordinates and/or size of the objects. Additionally, data visualization apparatus 104 may include a data-bound anchor module 116 to define a unilateral, spaced relationship between anchors on multiple graphic objects that are bound to data that is maintained through particular movements of the graphic objects. The components of data visualization apparatus 104 are discussed separately with reference to the figures below. However, the components may be used in conjunction with one another to perform one or more functions of the data visualization apparatus 104.

Multi-Object Data Binding

In data-driven designs, there are often multiple objects having similar attributes, such as having the same shape, but differ in some visual aspect to convey information. For instance, traditional bar graphs include multiple rectangular-shaped bars with different heights to represent data. Creating these objects to represent data has traditionally been done by either using a template, which restricts creativity, or manually adjusting the visual property, such as the bar height) for each individual object, which may be time consuming and would not reflect later modifications to the data. Accordingly, aspects of this disclosure are directed to creating multiple graphic objects representing different data values by associating a data variable and a visual property of an existing graphic object.

Figure 2:
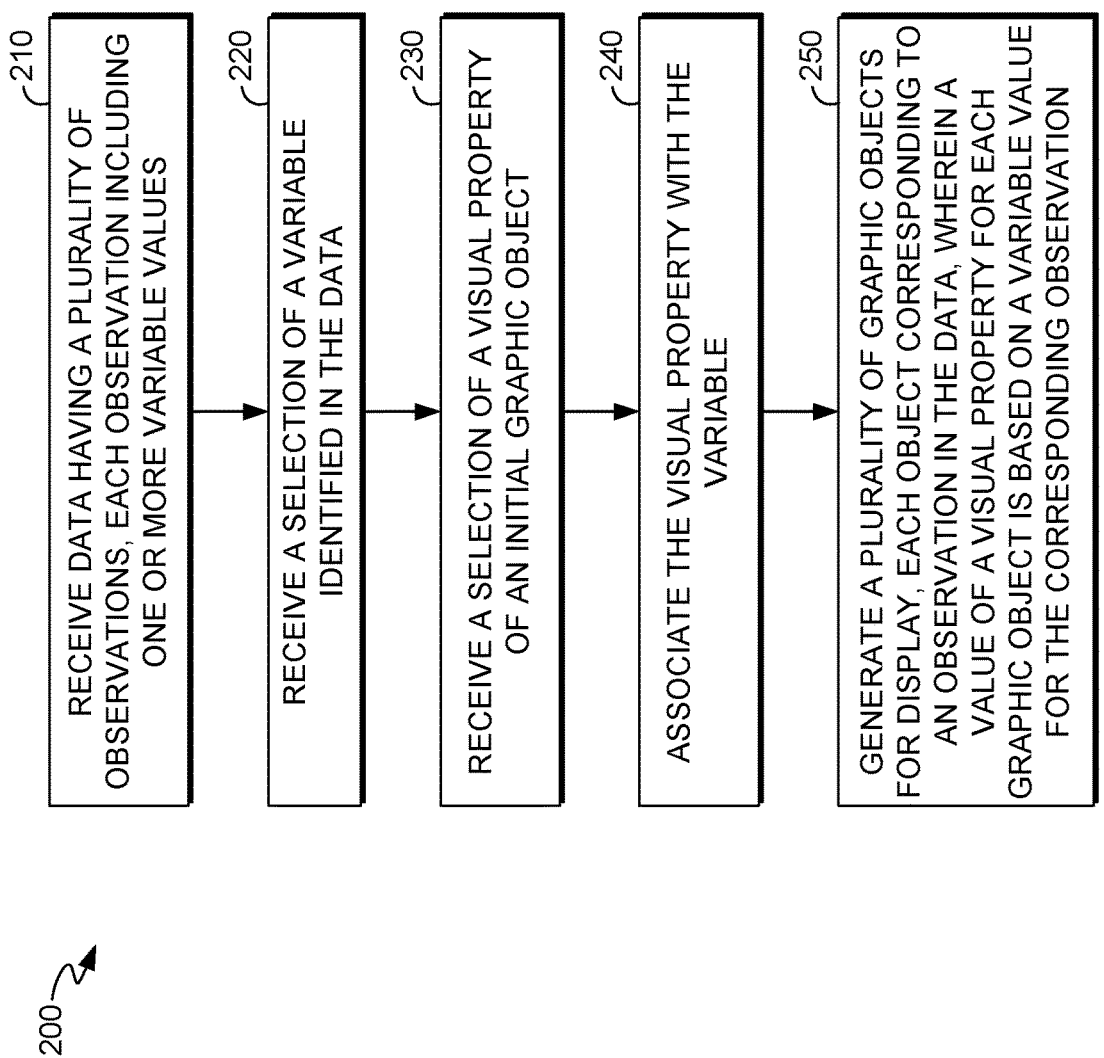
FIG. 2 depicts a block diagram illustrating an example method for creating multiple data-bound graphic objects, in accordance with various embodiments of the present disclosure.

With reference to FIG. 2, a flow diagram is provided to show an embodiment of a method 200 for creating multiple data-bound objects, in accordance with embodiments of the present invention. Method 200 may be performed, for example, by multi-object data binding module 112 of data visualization apparatus 104 illustrated in FIG. 1. Reference is also made to FIGS. 3A-E, which depict example graphical user interface environments that may be provided to the user during the course of one or more portions of method 200.

Figure 3A:
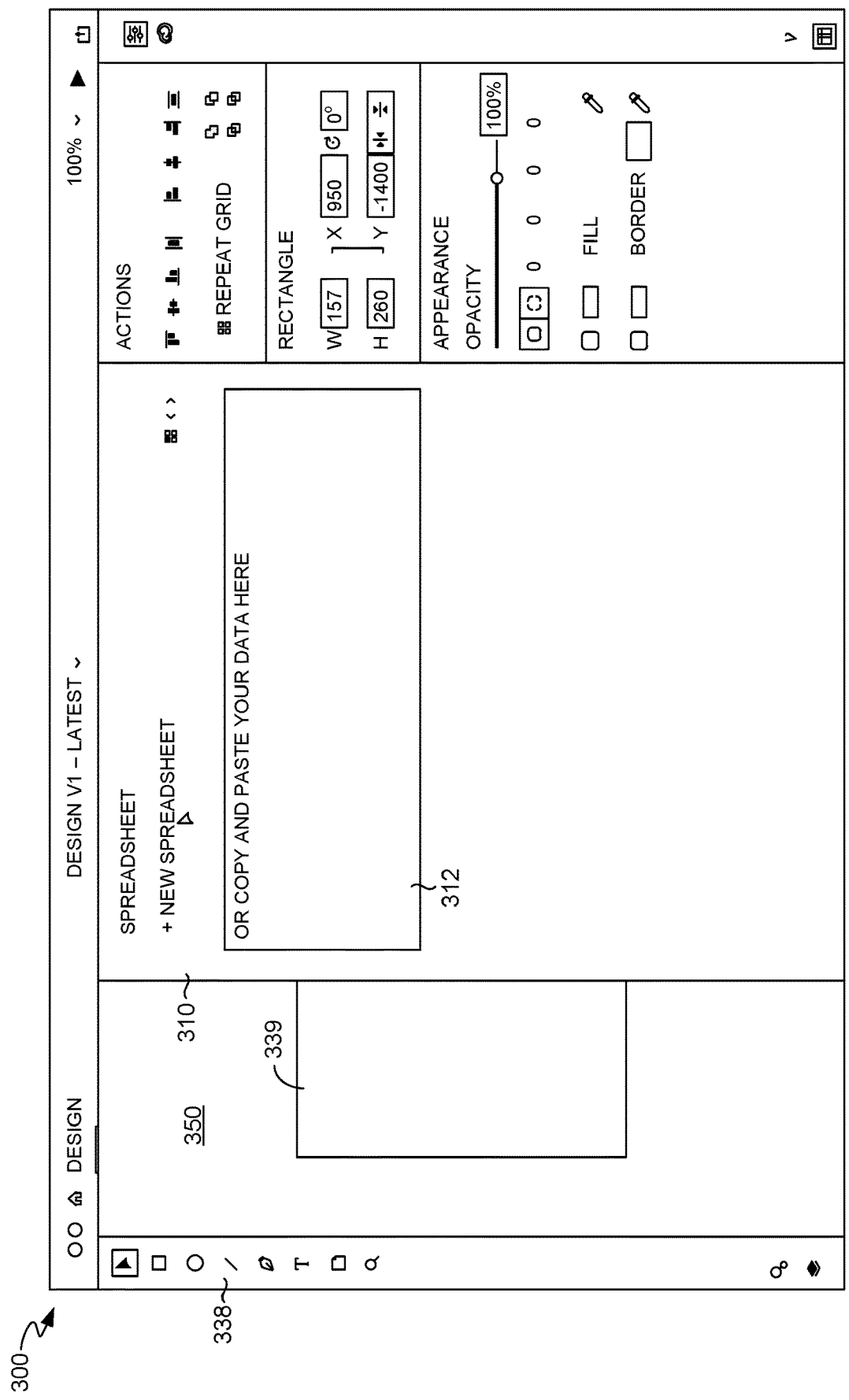
FIGS. 3A-E depict an example graphical user interface environment at various stages when creating multiple data-bound graphic objects, in accordance with various embodiments of the present disclosure.

At step 210, a data set is received. The data set may be received by a user importing a separate file containing the data set, such as a spreadsheet file. For example, FIG. 3A provides a graphical user interface (GUI) environment 300 with a spreadsheet area 310 in which a user can select an option to add a new spreadsheet to import a file containing the data. The file may be imported locally from the user's device, such as user device 102, or may be retrieved from a remote device. Alternatively, the data set may be received by a user entering the data directly into a text box 312 within the spreadsheet area 310 of the GUI environment 300. In exemplary embodiments, such as GUI environment 300 depicted in FIG. 3A, the data may be received either through an imported file, input in a text box, or from a remote data source accessed through a network. In exemplary aspects, the data can be received through multiple methods, and the user can choose the manner in which to provide the data.

Figure 3B:
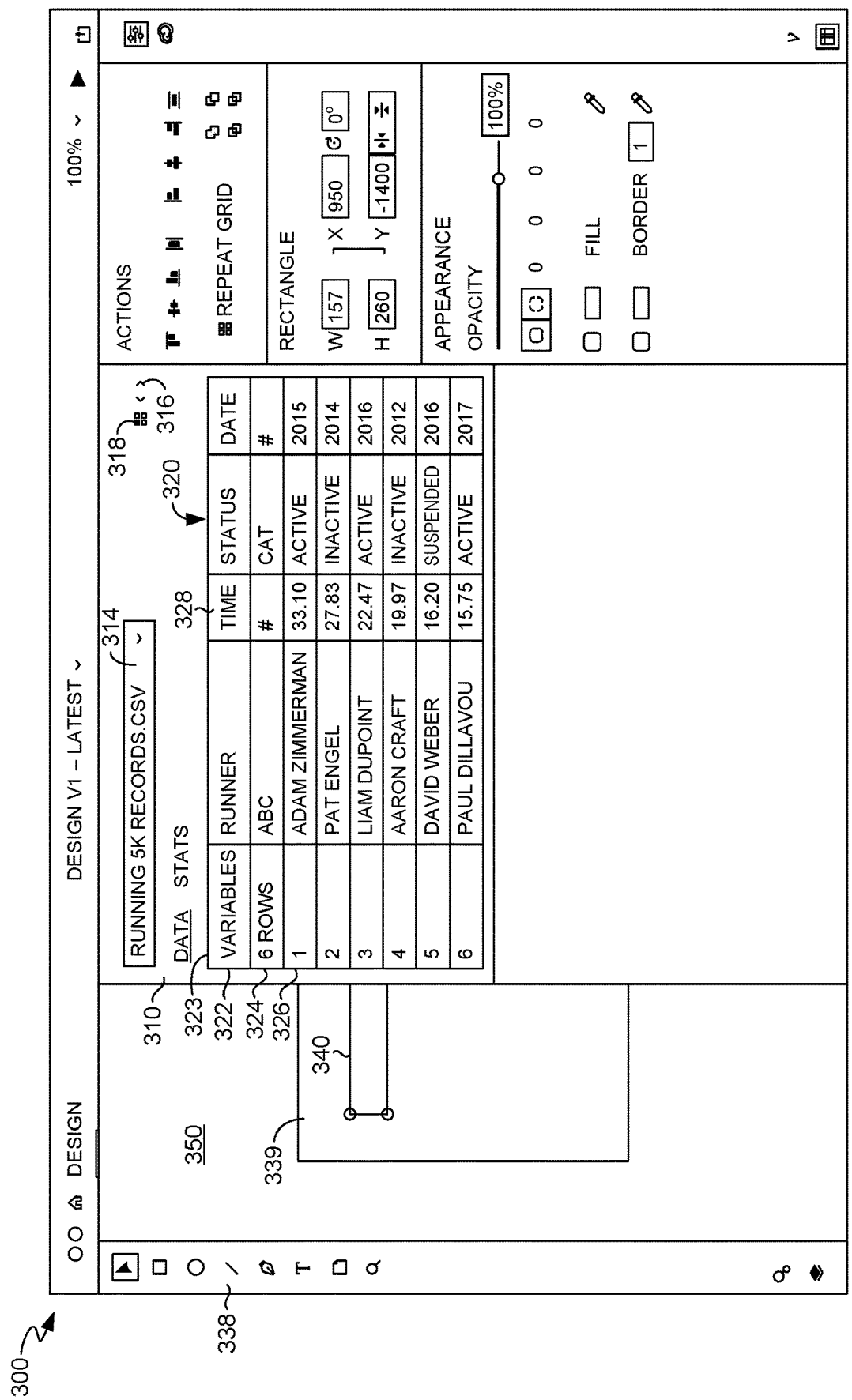

When the data set is received, it may be presented on GUI environment 300, as shown in FIG. 3B. In exemplary embodiments, the spreadsheet area 310 comprises a spreadsheet 320 or table including the received data set. Variables in the data set may be identified and labeled as such. Variables, as used herein, refer to characteristics, numbers, or measurable quantities. Each variable is represented by one or more data items, also referred to herein as variable values. Each instance of a variable's value belongs to an observation, which includes values for each variable. Data sets often have multiple variables, and as such, each observation comprises multiple variable values. For example, spreadsheet 320 shows four variables (runner, time, status, and date), and the first observation in row 326 consequently includes four variable values (Adam Zimmerman, 33:06, Active, 2015).

In some aspects, the data set is organized in a pre-determined format. In exemplary embodiments, for example, the data may be organized in a table or a spreadsheet. Additionally, the data may be organized as tidy data, which is an organization of data that links the data structure (rows, columns, and cells) with data semantics (observations, variables, and values). FIG. 3B depicts a tidy data organization. In accordance with a tidy data format, each variable is assigned its own column, and each observation is assigned its own row. For instance, time variable data is entered into column 328, and data for the first observation extends across row 326. Each variable value occupies its own cell within spreadsheet 320. An observation comprises a set of variable values comprising a data value for each variable. Using tidy data creates a 1:1 relationship between observations (e.g., rows in a tidy data spreadsheet) and a graphic object or grouping of graphic objects that can be used for data binding.

In some embodiments, one or more additional rows or columns may be added to label the variables and observations. For instance, the first row 322 may provide variable names for each of the identified variables, and the first column 323 may identify the number of observations found in the data set. A variable type may also be automatically identified in the data and labeled in spreadsheet 320. Second row 324 in FIG. 3B, for example, labels the variable types as either numerical values, word text (labeled as "ABC"), or categories (labeled as "CAT"). In other aspects, additional variables types, such as dates, may be identified and labeled. A category variable type may be identified when at least one variable value repeats itself across different observations. For instance, the status variable includes multiple observations with "active" and "inactive" such that embodiments may determine status to be a category.

In some aspects, the data is not received in the pre-determined data format, such as tidy data, and embodiments of the disclosure perform one or more processes to organize the data into the pre-determined format. For instance, embodiments may automatically perform gathering (when at least some of the column names are values of variables instead of the names of variables), spreading (when an observation is scattered across multiple rows), separating (when one column has multiple variables), and uniting (when a single variable is broken into separate columns). Although the data set in FIG. 3B is tidy data, it is contemplated that other types of data structures may be used.

Spreadsheet area 310 of GUI environment 300 may comprise one or more tools to change the data set being used. Spreadsheet area 310, for example, includes a drop down menu 314 to allow the user to choose a different data set to import or use. Additionally, the spreadsheet 320 shown in spreadsheet area 310 may only be a portion of the received data set, and, as such, spreadsheet area 310 may further include icon 316 to allow a user to switch to a different portion of the data set. For instance, the data set received may include additional observations not already displayed in spreadsheet area 310 and/or may include additional variables not displayed. In some embodiments, multiple spreadsheets are received, and spreadsheet area 310 may include icon 318 to switch to other spreadsheets. The multiple spreadsheets may be received separately or may be received as a single spreadsheet that is split or filtered into multiple smaller spreadsheets. In some aspects, spreadsheet area 310 also includes selectable text or an icon to show commonly used statistics for the data, such as minimum value, maximum value, and mean, for example.

The data received in step 210 of method 200 is data that will be used for determining at least some visual properties within an illustration. Accordingly, either before or after the data set is received, at least one graphic object may be created or imported and displayed on a workspace area 350 of GUI environment 300. Workspace area 350 refers to a portion of GUI environment 300 in which creative content is displayed and manipulated. Workspace area 350 may include a design canvas, such as canvas 339 on which graphic objects are presented for creation of an illustration document or file. The graphic object may be created on workspace area 350 with user input using one or more illustration tools, for example. GUI environment 300 includes a tool bar 338 with icons to select tools for creating one or more objects. The tools include a text tool to create text, a shape tool to create a pre-defined geometric shape, and one or more draw tools to free draw an object.

In FIG. 3B, a rectangle object 340 has been created and is presented on display canvas 339 of GUI environment 300. Other example objects that may be created include other geometric shapes, an icon/symbol, an image, or a text box. In exemplary aspects, the object is created using tools provided by an application that functions outside of data visualization apparatus 104. In this way, embodiments of this disclosure are integrated into existing graphic design applications that are also usable to create output without data binding, such as Adobe Illustrator®, Adobe Photoshop®, and Adobe XD®.

Figure 3C:
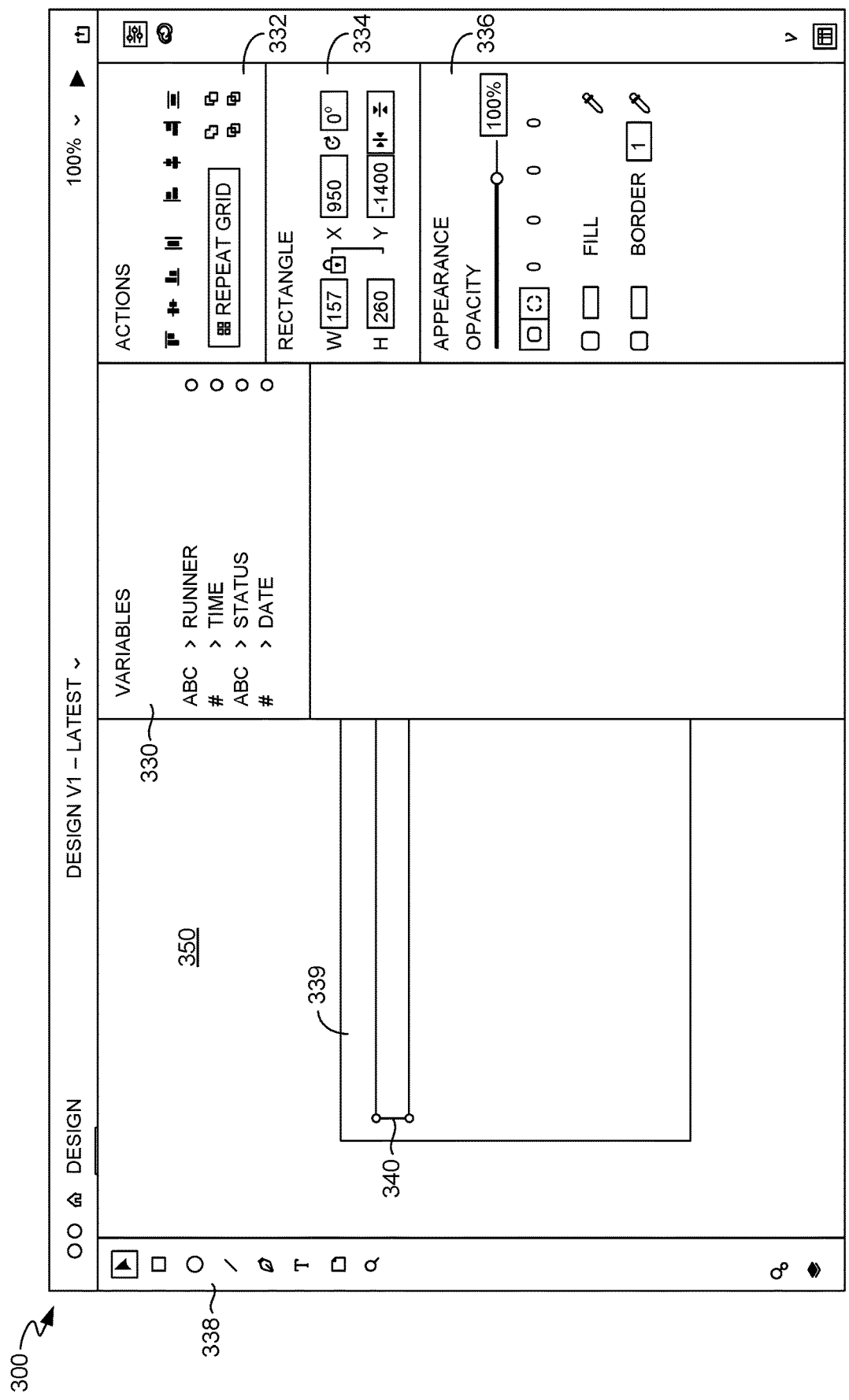

When the data set is received, a variables area 330 of the GUI environment 300 is automatically populated with a list of variables identified from the data set, as shown in FIG. 3C. In embodiments, the variables are identified and populated based on the pre-determined data format. For example, the different variables may be determined by column labels for tidy data. The variables area 330 may further include the variable type for each variable. In some aspects, GUI environment 300 comprises one or more additional areas, including an actions area 332, a transformations area 334, and an appearance area 336. These areas may provide options of different actions or manipulations to be made to the visual appearance of the objects. For instance, the transformations area 334 may include fields for inputting X-Y coordinate positions and a width and height of the rectangle object 340, and the appearance area 336 may provide options for creating a fill or border. Accordingly, one or more of these areas may be referred to as properties areas. Additionally, as used herein, each of the areas 330, 332, 334, and 336 may be referred to as a palette and, in some aspects, may be moved around GUI environment 300 by the user.

Continuing with method 200, at step 220, a selection of a variable from the data set is received, and a selection of a visual property of an object (e.g., the object 340) is received at step 230. The variable and visual property that are selected are the ones that the user wishes to bind together. The visual property is selected for an existing object, such as rectangle object 340, presented within the workspace area of the GUI environment 300. Visual properties may include color, size, position, rotation, stroke size, transparency, text content, or font style. In some aspects, the object is selected by the user prior to selection of the visual property and/or variable. Unlike with traditional template-based visualizations, the user can first draw or otherwise create the graphic object to which data is being bound and then select which visual property will represent the data values rather than choosing between templates with pre-determined graphic objects and visual properties to be represented by existing data.

In some embodiments, the user selects the variable by selecting one of the variables listed in the variables area 330. Upon selecting the variable, a list of possible visual properties of the selected object may be provided. The list of visual properties from which to select may include all visual properties relating to the type of object selected. For instance, the visual properties for rectangle object 340 may include any visual property in the transformation or appearance areas 334 and 336, respectively, including width, height, position, orientation, fill, border, opacity. Although not shown in FIGS. 3A-E, area of an object may also be a visual property that the user can select for a geometric shape object. Visual properties for an image may include one or more of the previous properties in addition to contrast and brightness properties, and a text box object may include additional properties, including font and spacing.

In some aspects, visual properties available for selection are further based on the type of variable selected. For instance, a number variable type may include visual properties that with numerical property values, such as width, height, position, and orientation. Color of a fill or border may also be presented for number type variables. For text type variables, the color of a fill or border may be presented as visual property types.

Accordingly, a list of visual properties may be presented to the user as a drop-down menu from the selected variable in the variables area 330 or as a separate pop-up window, and the user may select the visual property to bind to that variable. Alternatively, the user may select the variable from the variables area 330 and drag the selected variable over to a particular visual property in another area of the GUI environment 300, such as the height field in the transformation area 334. The user may also be able to drag the selected variable directly from the spreadsheet area 310, rather than from the variables area 330.

Further, it is also contemplated that the visual property may be selected before the variable is selected. For instance, the user may select a visual property and receive a list of possible variables that may be associated with or linked to that selected property. The list may be a comprehensive list for that particular visual property or may further be tailored to the variable types presented in the data set. Similarly, in some aspects, a user may select the visual property and drag and drop the visual property over a variable within the variable area 330 or the spreadsheet area 310. In some embodiments, when the initial graphic object is a text box, a user may select a text selection from a spreadsheet or the variables area 330 and drag the text selection to the text box, which automatically selects the content of the text box as the visual property. Additionally, in some aspects, when a user drags text from the spreadsheet or variables area 330 to the canvas 339 or workspace 350, a text box is automatically created and the content of the text box is selected as a visual property.

At step 240 of method 200, the selected visual property is associated with the selected visual variable. In some embodiments, GUI environment 300 provides a visual indicator of this association. This association creates a binding, also referred to herein as a link, between the data and the graphic object 340 that is stored and maintained even when the data and/or the graphic object 340 are modified. In accordance with the association between the variable and the visual property, an observation within the data (such as a row in a spreadsheet) will correspond to a graphic object to which the visual property applies. In some aspects, each data observation is mapped to a grouping of graphic objects, which may be referred to as a cell, and at least one graphic object within that cell has a visual property associated with the data variable. In some embodiments, the order in which observations are used is, by default, based on the order of observations presented in data such that the rectangle object 340 corresponds to the first observation listed in spreadsheet 320 in FIG. 3B.

Figure 3D:
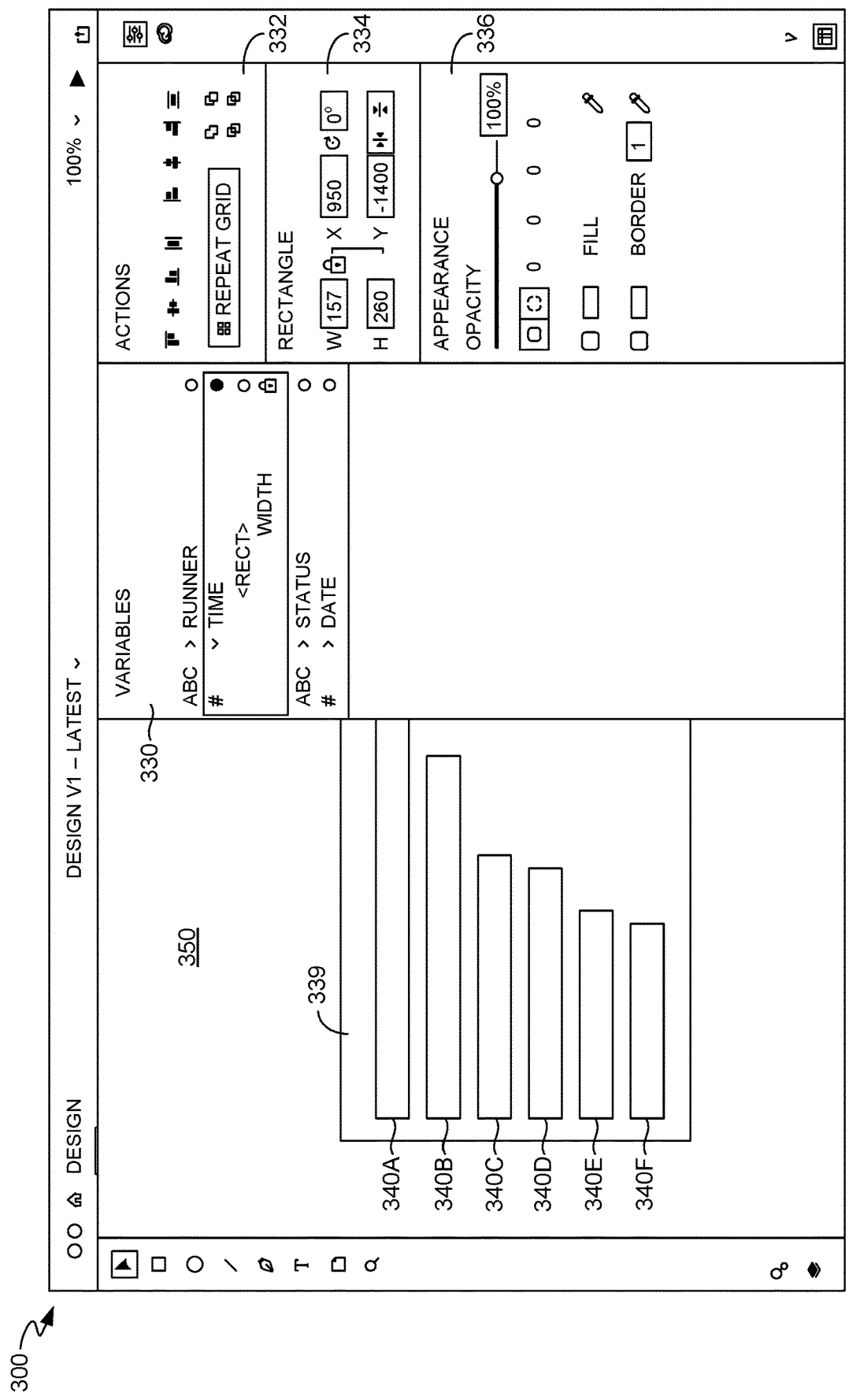

Continuing, at step 250, additional graphic objects based on the initial graphic object 340 are generated such that each observation has a corresponding graphic object. FIG. 3D, for example, shows six rectangle objects 340A-F, with each graphic object corresponding to the one of the six observations in spreadsheet 320 in FIG. 3B. Additional graphic objects 340B-F are created by automatically duplicating or repeating the initial graphic object 340A (previously referred to as object 340 in FIGS. 3B-C) such that the object type is the same as the initial graphic object 340A. Accordingly, additional graphic objects 340B-F are also rectangle graphic objects like initial object 340A. In some embodiments, all of the additional graphic objects 340B-F are automatically created and presented on a workspace 350 within GUI environment 300 when a user selects the initial graphic object 340A and selects an option to repeat the object. The actions area 332, for instance, may include a "Repeat Grid" button, the selection of which automatically replicates the initial graphic object 340A. In other embodiments, the additional graphic objects 340B-F are automatically created and displayed upon the user binding a data variable to a visual property of the initial graphic object 340A. Further, in some aspects, the additional graphic objects 340A-F are automatically created but presented for display individually as the user expands a display area, as discussed below with respect to FIGS. 5 and 6A-E. The initial graphic object 340A and the additional graphic objects 340B-F make up a set of graphic objects to which the data binding applies. The set of graphic objects 340A-F may be arranged in an array, such as a grid pattern, on the canvas 339. In some embodiments, the rules created by associations between a visual property and a variable can be hidden or ignored for one or more objects within a set of graphic objects such that the one or more objects are, at least temporarily, exempted from the data binding.

As each object within the plurality of graphic objects is created, the visual property for the object is rendered in accordance with the binding. Specifically, the value for the visual property of a graphic object is based on a variable value for the corresponding observation. In the example embodiment illustrated in FIG. 3D, the width of the rectangle objects 340A-F are bound to the time variable, as indicated by the "TIME" variable in the variable area 330 listing a "WIDTH" property for the rectangle object. Accordingly, although all graphic objects 340A-F are rectangle objects, the widths of each object may vary based on the variable value for the corresponding observation. The times listed in spreadsheet table 320 in FIG. 3B decrease moving from observation 1 to observation 6, and, similarly, the widths of the rectangles decrease moving from graphic object 340A (corresponding to observation 1) to object 340F (corresponding to observation 6).

The values used for the visual properties, such as width may be determined automatically by using the value for the initial graphic object 340A as a standard. In the example in FIG. 3D, for example, the user created a rectangle object with a width of 156 pixels. When the width property is bound to the time variable, the 156-pixel width of the initial graphic object 340A is set to represent the time value of the observation corresponding to the initial graphic object 340A, which is 33.1 minutes. Accordingly, 1 unit of time in the data is set to be represented by 4.72 pixels of width for the rectangle objects 340A-F. For example, rectangle object 340B, which corresponds to observation 2, has a width of 131.63 pixels to represent 27.83 minutes of time. When any of the times within the data are modified, the visual property values are automatically updated to reflect the changes in the data.

Figure 3E:
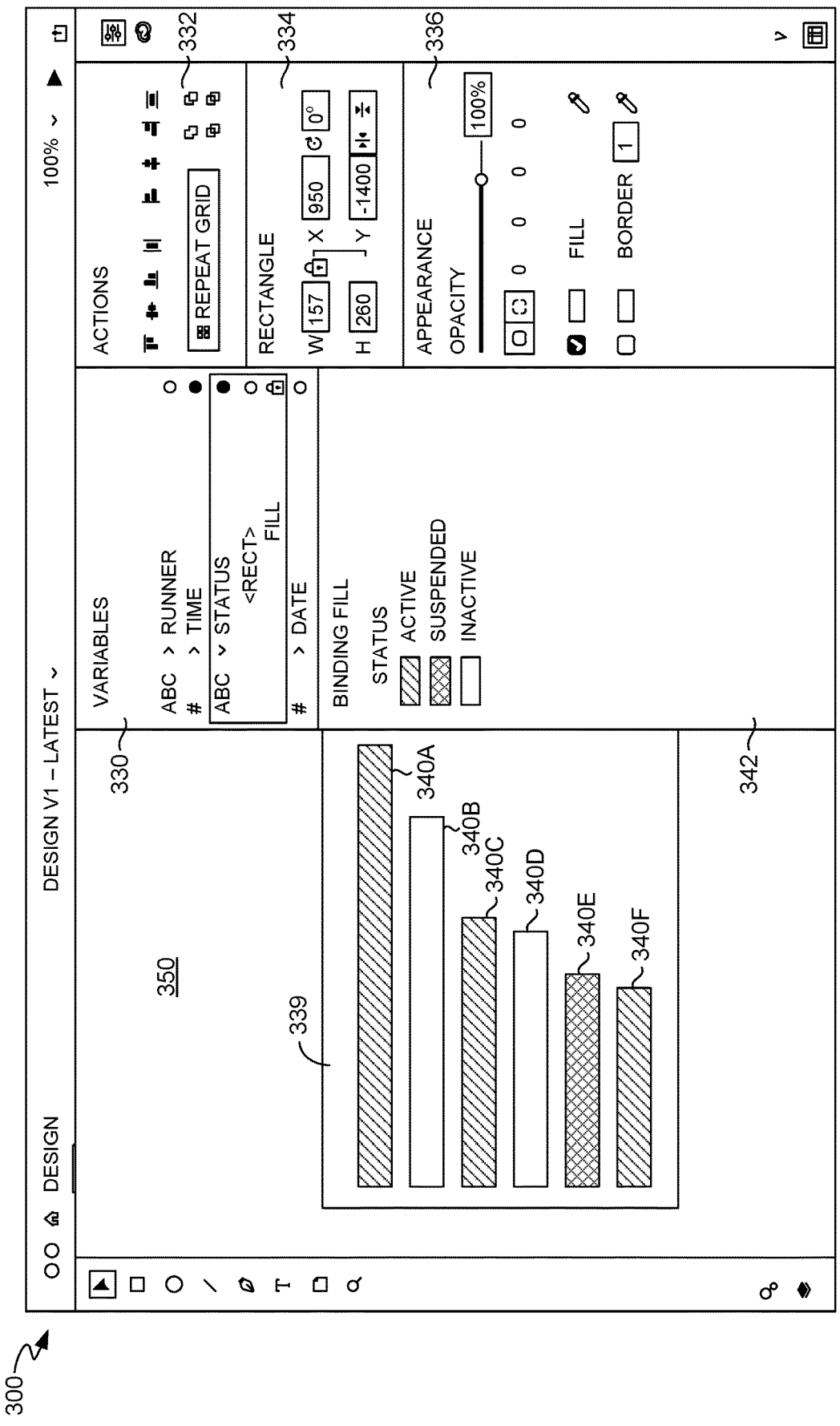

A set of graphic objects may have multiple visual properties bound to data. FIG. 3E, for example, illustrates objects 340A-F having a first visual property (width) bound to a first variable (time) and a second visual property (fill color) bound to a second variable (status). Because the status variable is an ABC variable type, the values for the fill visual property may be determined with input from the user. For instance, once the status variable is selected to be associated with the fill property for objects 340A-F, the different status categories identified in the data are presented to the user in a binding fill area 342. The user may select a color (i.e., the visual property value) to be assigned to each status category listed in the binding fill area 342. The visual property values for the individual graphic objects 340A-F are then determined by applying the color assigned to the status of the corresponding observation. For purposes of the illustration, FIG. 3E utilizes fill patterns instead of color. Accordingly, in FIG. 3E, graphic objects 340A, 340C, and 340F, which correspond to observations 1, 3, and 6, respectively, are filled with the pattern assigned to the "ACTIVE" status, while objects 340B and 340D, corresponding to observations 2 and 4, and object 340E, corresponding to observation 5, are filled with patterns assigned to "SUSPENDED" AND "INACTIVE" statuses, respectively.

Although not shown in the example depicted in FIG. 3E, a color, such as a fill color, may also be bound to a numerical variable, and the color property values assigned to each object may be automatically determined using color binning. Embodiments may identify the minimum and maximum variable values within the data set. The minimum and maximum values may be assigned to opposite ends of a grayscale or colored gradient. For instance, for a grayscale gradient, the maximum color may be assigned to black, and the minimum value may be assigned to white. The intermediate variable values found in the data set may be assigned proportionately along the grayscale or colored gradient. In some aspects, this process is done automatically, and the user has the option adjust the minimum, maximum, and/or intermediate values. The user, for example, may assign a variable number to a property value or color on the gradient as the standard, and the property values for each graphic object may be then determined based on the relationship between the corresponding variable value and the number assigned to the gradient by the user. Additionally, there may be different options that can be selected for determining the breaks for the different bins on the grayscale or colored gradient based on the range of variables values. For instance, the breaks may be based on equal intervals, quartiles, natural breaks, standard deviation, and pretty breaks, which makes intervals based on round numbers.

Figure 4:
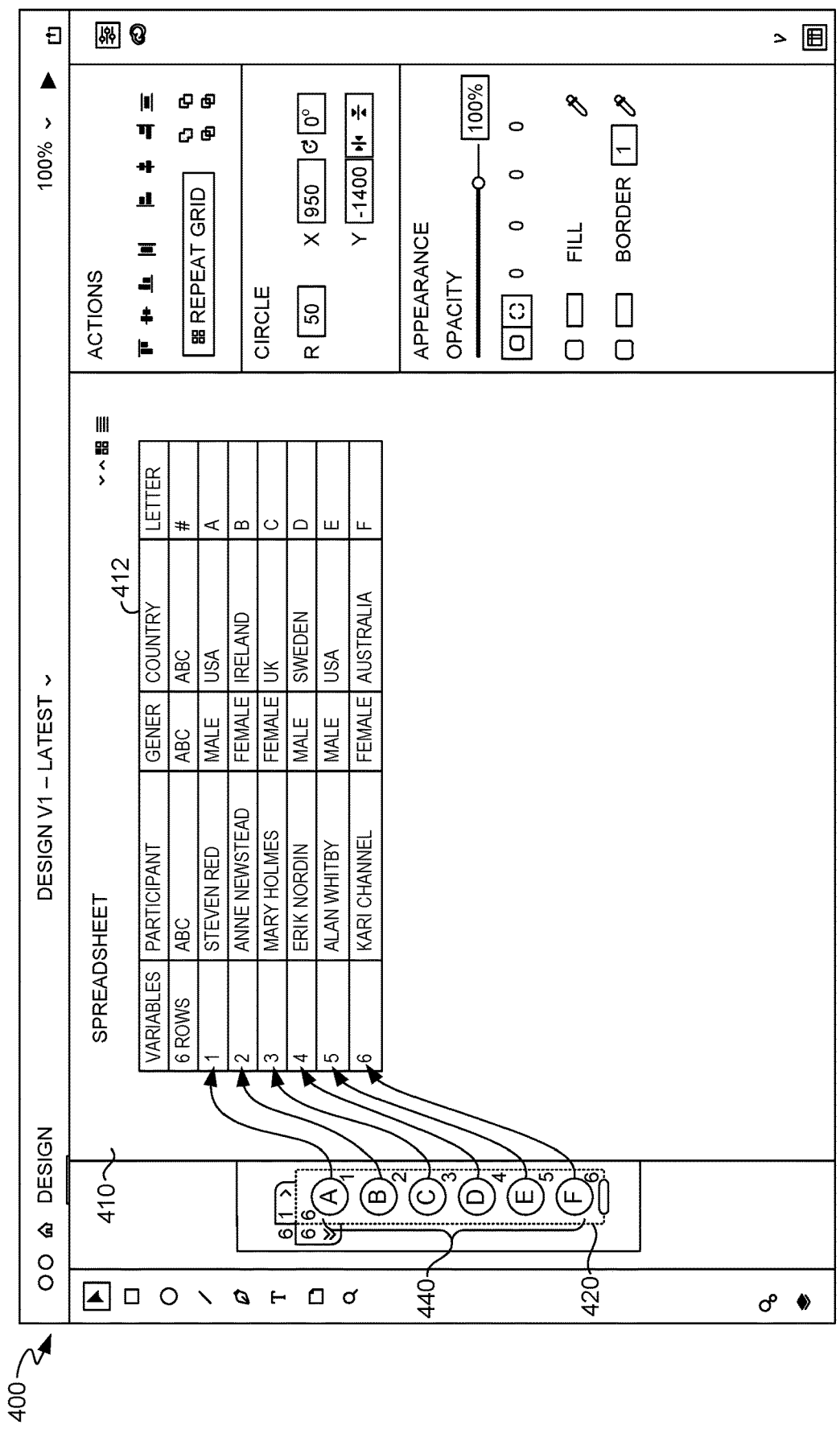
FIG. 4 depicts an example graphical user interface environment with multiple graphic objects in a display pattern corresponding to observations in an imported data spreadsheet, in accordance with various embodiments of the present disclosure.

As previously discussed, embodiments of the present invention include duplicating an object bound to data such that multiple graphic objects of the same object type are similarly bound to the same data variable. These repeated objects are arranged on a graphical user interface in an array, such as a grid pattern, for example. As illustrated in FIGS. 3D-E, the repeated objects are not identical because the graphic objects correspond to different data observations, which have varying variable values. Because the objects are not identical, the sequence and pattern in which the objects are presented affects the design. FIG. 4, for instance, depicts another example graphical user interface 400 with graphic objects bound to data in spreadsheet 412 in spreadsheet area 410. The data in spreadsheet 412 has six observations, and accordingly, there may be six graphic objects 440 that each correspond to an observation, as indicated by the arrows in FIG. 4. Each graphic object 440 includes text of the letter variable for the corresponding observation.

In FIG. 4, the graphic objects 440 are presented within a display area 420 in a vertical direction in a sequence from "A" to "F". A user, however, may wish to have the objects ordered horizontally, in multiple columns and rows, and/or in reverse order. Traditionally, to rearrange the pattern, a user would need to manually move the graphic objects 440, which may be time consuming when there are several objects. Because graphic objects 440 are bound to variable data for observations that are arranged in a particular order, however, there is an order initially associated with the graphic objects 440 that can be leveraged to determine alternative layouts with minimal input from the user.

Figure 5:
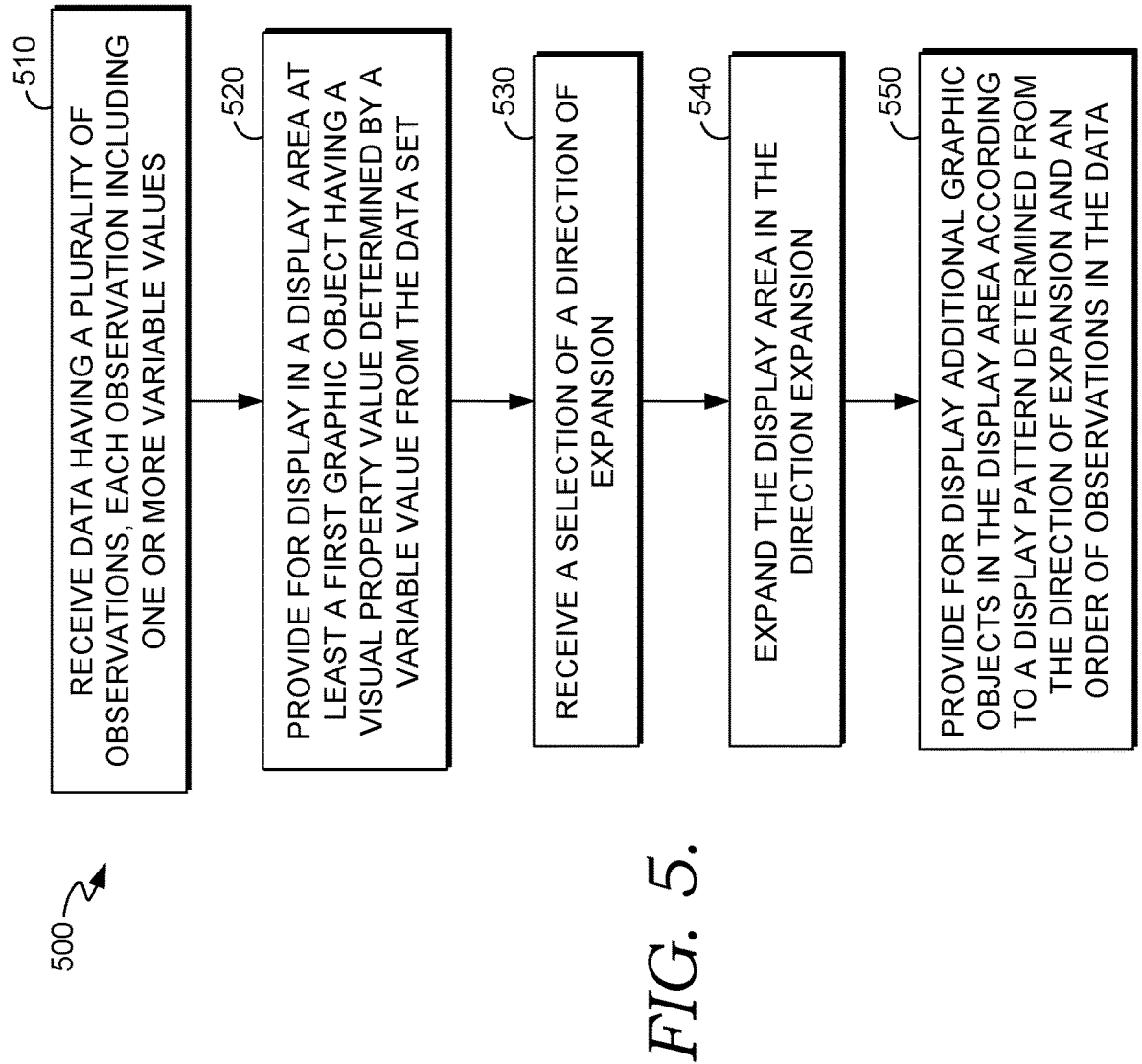
FIG. 5 depicts a block diagram illustrating an example method for determining a display pattern for multiple data-bound graphic objects arranged within a graphical user interface, in accordance with various embodiments of the present disclosure.

Turning to FIG. 5, a flow diagram depicting a method 500 for creating a display pattern for data-bound graphic objects is provided in accordance with embodiments of the disclosure. FIGS. 6A-F depict graphic objects presented in a display area 620 of a graphical user interface in accordance with embodiments of method 500. The example embodiments illustrated in FIGS. 6A-F are based on a similar data set shown in spreadsheet 412 in FIG. 4 except the data used for FIGS. 6A-F comprise sixteen observations, rather than the six observations shown in FIG. 4. For clarity, display area 620 in FIGS. 6A-F is presented outside a GUI environment, but it is contemplated that display area 620 may be part of a larger GUI environment, similar to display area 420 of GUI environment 400 of FIG. 4.

Figure 11A:
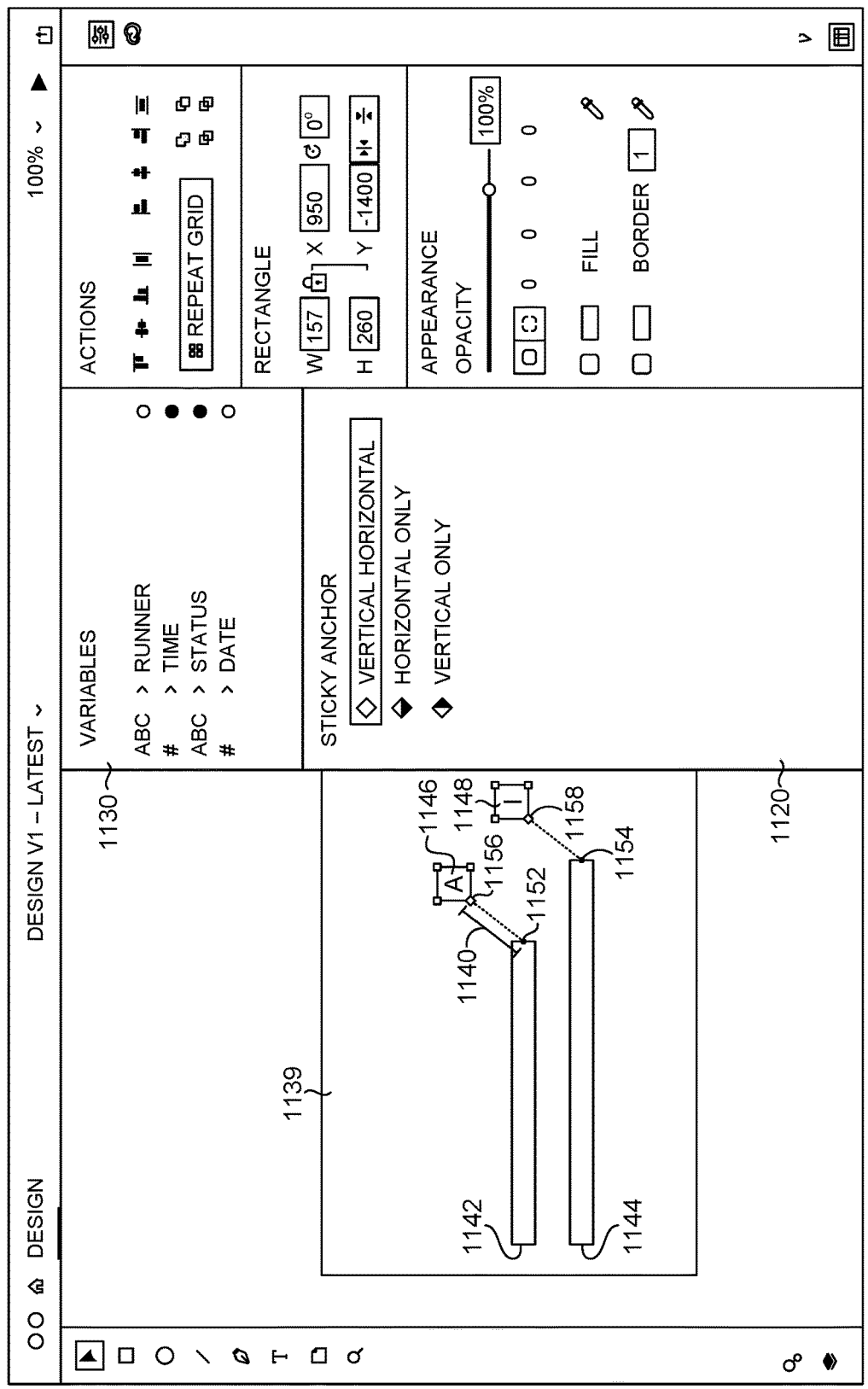
FIGS. 11A-D depict an example graphical user interface environment with graphic objects having a fixed, unilateral spatial relationship, in accordance with various embodiments of the present disclosure.

Method 500 comprises, at step 510, receiving data having a plurality of observations that each include one or more variable values. The data may be in a similar data structure and received in a similar manner as described with respect to FIG. 2. At step 520, a first graphic object is presented for display on a GUI, such as GUI environment 400 of FIG. 4. The first graphic object corresponds to a first observation in the received data set, and a visual property of the first graphic object is associated with a data variable in the data set similar to the manner described in method 200. In FIG. 6A, for example, a first graphic object 640, also referred to herein as object A, corresponds to the first observation listed within the data set, and the text content of graphic object 640 is associated with the letter variable in the data. By default, the first graphic object displayed corresponds to the first observation listed within a received data set. Although not specifically illustrated in FIG. 6A, a graphic object may indirectly correspond to an observation when the observation corresponds to a cell or grouping of objects that includes the graphic object. FIG. 11A, for example, depicts rectangular objects 1142 and 1144 and text objects 1146 and 1148. Where objects 1142 and 1146 belong to the same cell corresponding to an observation, rectangle object 1142 may have a visual property (such as width) corresponding to a data variable, and the text object 1146 may have another visual property (such as text content) corresponding to a data variable, with the visual property values for each object being based on data values from the same observation.

As shown in FIG. 6A, the graphic object 640 may be presented within a display area 620 of a GUI that is dedicated to displaying a set of similar graphic objects in a display pattern. In some embodiments, the display area 620 provides information regarding the layout to the user and is configured to receive input regarding the desired object layout from the user. For example, a display area boundary 622 encircles graphic object 640 and is presented with a visibility information area 628. The visibility information includes the number of graphic objects exposed or displayed in the display area 620 and the total number of graphic objects that can be exposed, which is equal to the number of observations found in the linked data. Here, the visibility information area 628 lists "1" in the numerator position to represent only one graphic object (object A) being visible in the display area 620 and lists "16" in the denominator position to represent the maximum number of objects that can be displayed based on the number of observations. Additionally, the display area 620 may include a column area 630 listing the number of columns of objects that are exposed and a row area 632 listing the number of rows of objects that are exposed. In FIG. 6A, the visibility information area 628 is positioned by the upper-left corner of the display area boundary 622, with the column area 630 extending towards the right side and the row column area 632 extending downward. This placement of the visibility information area 628 and/or column and row areas 630 and 632, respectively, indicates that this first graphic object 640 will form the upper-left corner of the display pattern.

The display area 620 may further include one or more controls for adjusting the size of the display area 620. For example, there may be a horizontal handle 624 and a vertical handle 626, which are also referred to herein as selectable sizing controls. The horizontal handle 624 may be selected for expanding the display area 620 in a horizontal direction, and a vertical handle 626 may be selected for expanding the display area 620 in a vertical direction. In the embodiment illustrated in FIG. 6A, the horizontal handle 624 forms a portion of the right side of the display area boundary 622, while the vertical handle 626 forms a portion of the bottom side of the display area boundary 622. It is contemplated, however, that these handles may be presented in other areas of the display area 620.

Continuing with method 500, at step 530, a selection of a direction of expansion is received. The direction of expansion is the direction in which the display area 620 is expanded to expose additional graphic objects. A horizontal direction of expansion displays additional graphic objects in a horizontal relationship by creating additional columns, whereas a vertical direction of expansion displays the graphic objects in a vertical relationship by creating additional rows. In exemplary aspects, the direction of expansion is selected via the horizontal handle 624 or the vertical handle 626. A user may select and drag the horizontal handle 624 to the right to select the horizontal direction of expansion, or a user may select and drag the vertical handle 626 downward to select the vertical direction. The display area 620 may expand in the direction of expansion, as provided in step 540. When the display area 620 expands, the area within the display area boundary 622 increases, while the initial graphic object 640 remains the same size and position.

At step 550, additional graphic objects are provided for display within the expanded display area 620 of the GUI environment. The additional graphic objects and the initial graphic object 640 are arranged according to a display pattern determined from the order of observations within the data set and the selected direction of expansion. The objects are arranged in an order matching the order in which the corresponding observations are stored within the data set. In some embodiments, each observation comprises a row in the spreadsheet and, therefore, the display order of the graphic objects is determined by the sequence of rows in the spreadsheet. For a data set having observations 1, 2, 3, . . . n, the sequence in which the graphic objects are exposed within the display area 620 is $object_1$, $object_2$, $object_3$, . . . $object_n$. Using the order of observations in the data set is likely a logical or desired order for the user because the user often chooses how to sort or order observations in the data set. Additionally, because the graphic objects are ordered based on the order of corresponding observations, when the order of observations in the spreadsheet is changed, such as when the sorting order is flipped, the order of the graphic objects also changes to reflect the new observation order.

The direction in which the ordered graphic objects are presented is the direction of expansion, such that a horizontal direction of expansion results in the objects being sequentially arranged along a horizontal axis and a vertical direction of expansion results in the objects being sequentially arranged along a vertical axis. Additionally, the direction of expansion may be further defined in relation to the position of the initial graphic object 640. For example, a horizontal direction may be either to the right of the initial graphic object 640 or to the left of the initial graphic object 640, and a vertical direction may either be below or above the initial graphic object 640. In some embodiments, the initial graphic object 640 is set to be in the upper-left portion of the display area 620 such that a vertical direction is downward and a horizontal direction is to the right.

Figure 6B:
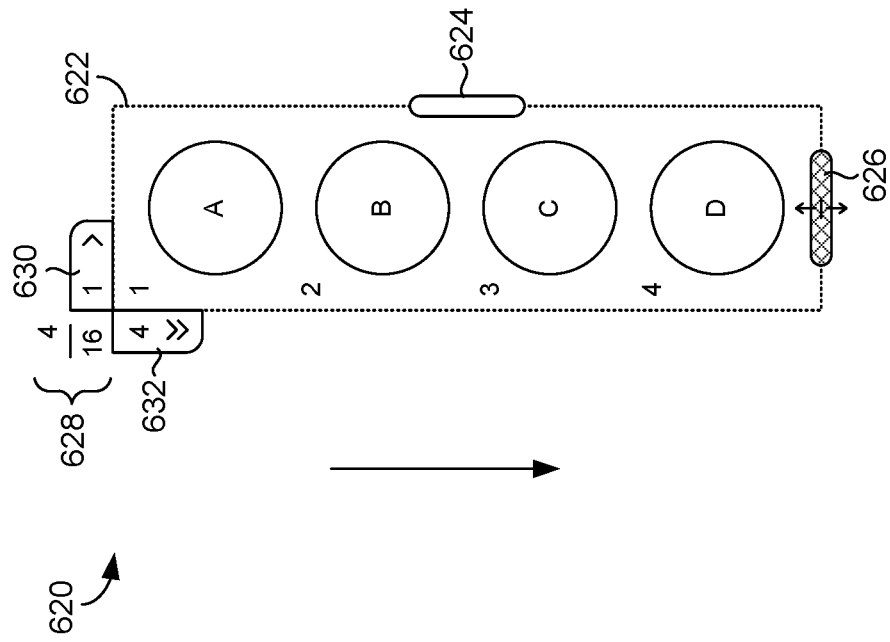
Figure 6A:
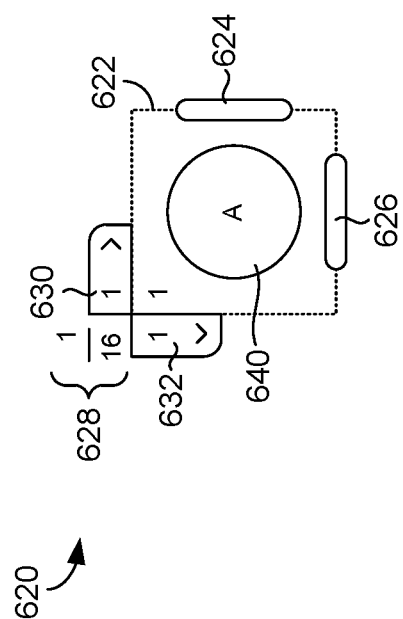

FIG. 6B illustrates the display area 620 after a user selects a vertical direction of expansion by pulling down on the vertical handle 626. Accordingly, the graphic objects A-D are arranged in a vertical relationship. The order in which the graphic objects A-D are exposed within display area 620 follows the order in which the corresponding observations are presented in the spreadsheet (e.g., the spreadsheet 412 shown in FIG. 4). As additional graphic objects are exposed, the information within the visibility information area 628 and/or column and row areas 630 and 632, respectively, may be updated to reflect the changes to the display area 620. In FIG. 6B, the numerator within the visibility information area 628 has changed from "1" to "4" to indicate that four objects are exposed within the display area 620, and the row area 632 has been updated to show that there are four rows of objects.

FIG. 6B depicts the display area 620 when some but not all of the data observations have corresponding graphic objects exposed within the display area 620. In exposing all 16 graphic objects, the display pattern could be based solely on the vertical direction of expansion initially selected and consist of a single column of 16 graphic objects. In exemplary aspects, however, the initially selected direction of expansion is the primary direction, and a secondary direction of expansion may be selected by the user to also arrange the objects within rows. In FIG. 6C, for instance, after objects A-D are exposed along the vertical direction, a user may drag the horizontal handle 624 to select the horizontal direction for further exposing additional graphic objects. Accordingly, graphic objects A-P are exposed first in the primary direction (vertical direction) until a there is a set number of rows with graphic objects. Graphic objects forming the first column of rows is a set of graphic objects, and sets of objects are arranged within the secondary direction until the maximum number of graphic objects is exposed. In FIG. 6C, there are four objects ordered in the primary, vertical direction (graphic objects A-D), and the sets of four objects are arranged in the secondary, horizontal direction across the display area 620. As illustrated in FIG. 6C, the primary direction being vertical may be indicated with a double-arrow icon in the row area 632, which corresponds to the vertical direction, while the column area 630, corresponding to the horizontal direction, has only a single-arrow icon. These direction icons may also be selected by the user to select the direction of expansion rather than dragging handles 624 and 626.

The selection of the primary and secondary directions of expansion in FIGS. 6B-6C may occur by detecting the user dragging the respective handle 624 and 626. The user may manually drag the vertical handle 626 using the cursor, for example, until a desired number of rows are exposed, thereby setting the number of graphic objects within a set. Then, the user may drag the horizontal handle 624 until a desired number of sets (e.g., columns) of graphic objects are exposed, with the number of columns being limited by the already set number of rows and the number of observations within the data set. It is also contemplated that a user may edit the number of columns and/or rows in the column area 630 and the row area 632, respectively. For instance, the display pattern in FIG. 6C may be achieved by the user first entering "4" in the column area 630 and then entering "4" in the row area 632. In data sets involving a large number of observations, automatically expanding the display area 620 by entering the numerical values into the in the column and/or row areas 630 and 632, respectively, may be more efficient that dragging the handles to expose objects.

Figure 6F:
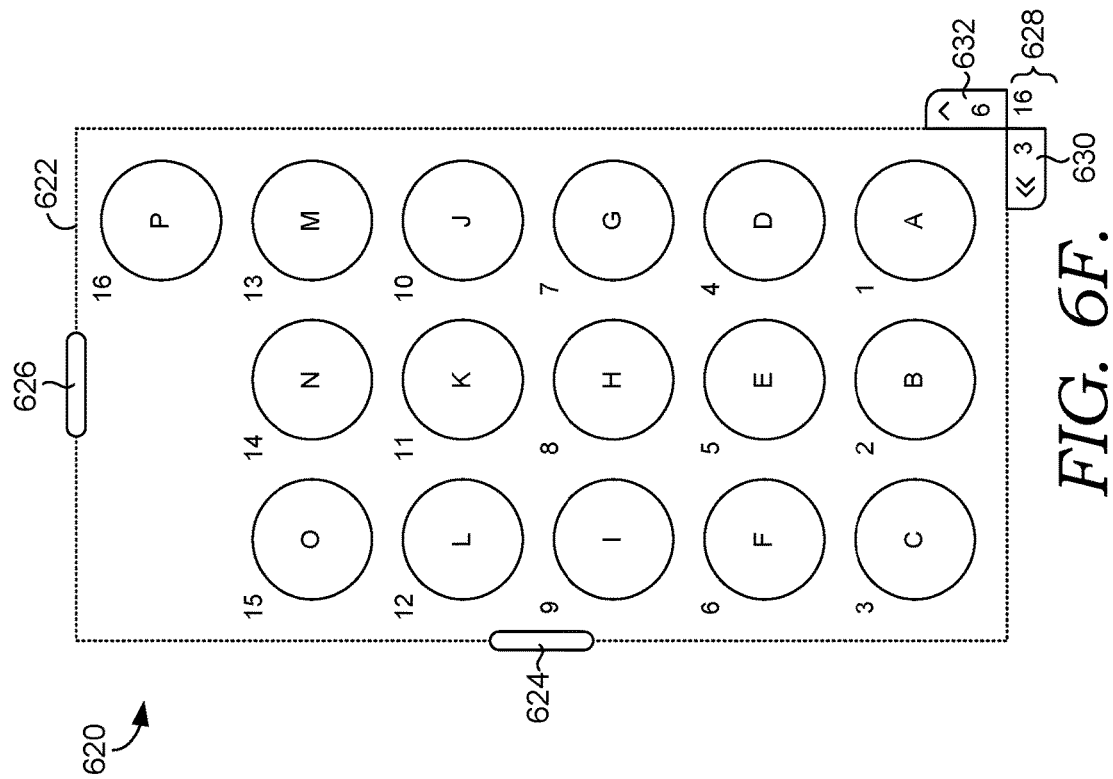
Figure 6E:
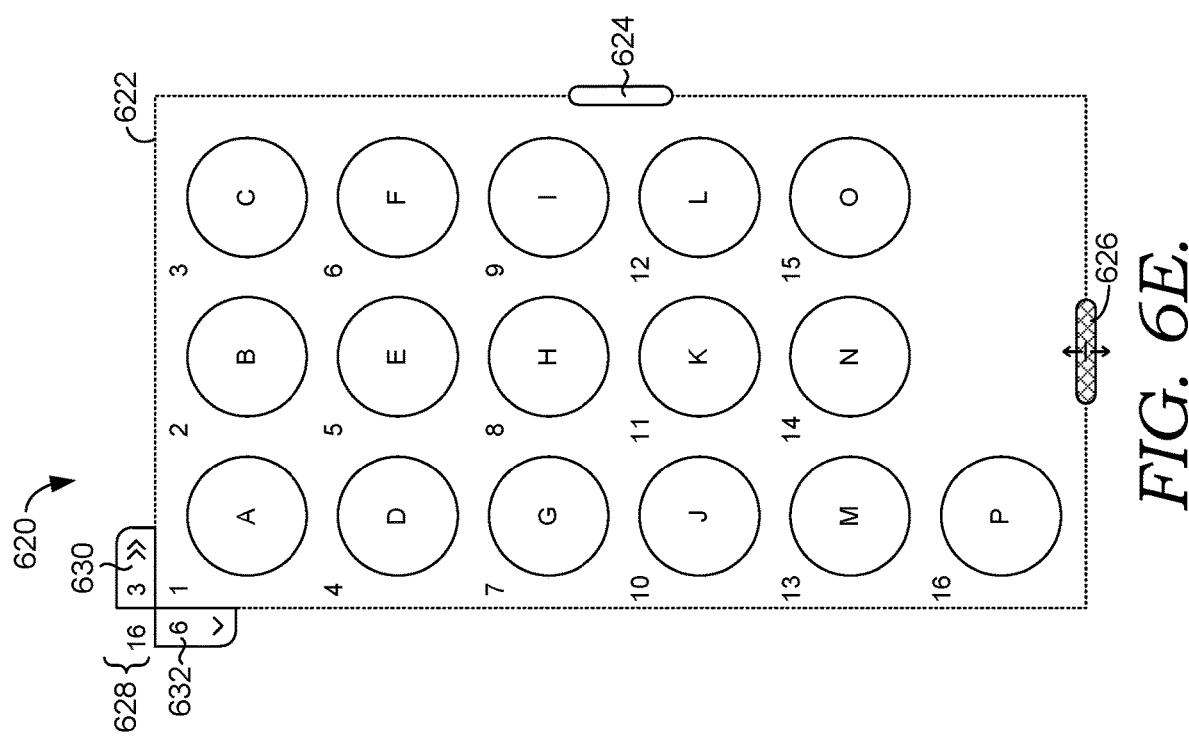

In some aspects, the display pattern of the graphic objects may be modified by changing the primary and secondary directions after the objects have been displayed. By way of illustration, FIG. 6D shows a display pattern in which the graphic objects A-D are first arranged in columns in accordance with a primary horizontal direction, and the sets of columns are arranged in rows in accordance with a secondary vertical direction. This new display pattern may be created from the display pattern in FIG. 6C upon the user interacting with the arrow icon in the column area 630. For instance, the user may double-click the single-arrow icon in the column area 630 to change the horizontal direction from the secondary direction to the primary direction. This change automatically results in the vertical direction becoming the secondary direction. In some embodiments, the number of rows and number of columns remain the same after the primary direction is changed. However, the numbers of rows and columns may be changed. For example, a user may adjust the horizontal and/or vertical handles 624 and 626, respectively, to change the number of rows. The number of rows and columns may be modified by entering new numbers in the row area 632 and column area 630, respectively. Alternatively, a user may drag the vertical handle 626 and/or the horizontal handle 624 to adjust the number of rows and columns. In these embodiments, the initial movement of one of the handles 624 and 626 sets the primary direction of expansion, and additional movements of the handles change only the number of rows and columns while maintaining the same primary direction of expansion. FIG. 6E depicts the display area 620 after it has been modified from the display pattern in FIG. 6D to comprise three columns and six rows.

As previously mentioned, the display pattern of the graphic objects is, in part, determined by a pre-determined position of the initial graphic object (object A), which is the upper-left corner in FIG. 6E. In some embodiments, this position, which may also be referred to as a starting corner, may be changed to modify the display pattern. FIG. 6F, for instance, depicts the initial graphic object A being positioned in the bottom-right corner of the display area 620. The primary direction is still horizontal but now is a right-to-left direction, and the secondary vertical direction is a bottom-to-top direction. The user may select this new position for the initial graphic object A by selecting and dragging the visibility information area 628 and/or one or both of the row area 632 and column area 630 to the bottom-right corner of the display area 620. Additionally, handles 624 and 626 may be moved along the display area boundary 622 to reflect the new position of the initial graphic object A.

Axis Control for Data-Bound Objects

After data is bound to a property affecting size or position of the graphic objects, a user may desire to adjust the size of the objects for a different visual result. Accordingly, an axis control for the graphic objects may be created when binding the objects to a variable to allow a user to adjust the size of the objects while maintaining the data binding. This axis control may represent a new coordinate system created for the graphic object. Generally, digital design applications define positions of objects on a digital canvas with a set coordinate system, such as the Cartesian grid. The Cartesian grid coordinate system defines positions of graphic objects on a canvas based on X-axis and Y-axis units from an origin point, which is denoted as (0,0). Traditionally, this default coordinate system has an origin in the lower-left corner or upper-left corner of the canvas, such as corner 842 of canvas 839 in FIG. 8A, and is used to define every object within the canvas. The new coordinate system that is created and represented by the axis control may apply to only certain graphic objects and may be based on data bound to those objects. The axis control is created to represent the new coordinate system and used to adjust graphic objects to which the new coordinate system applies.

Figure 7:
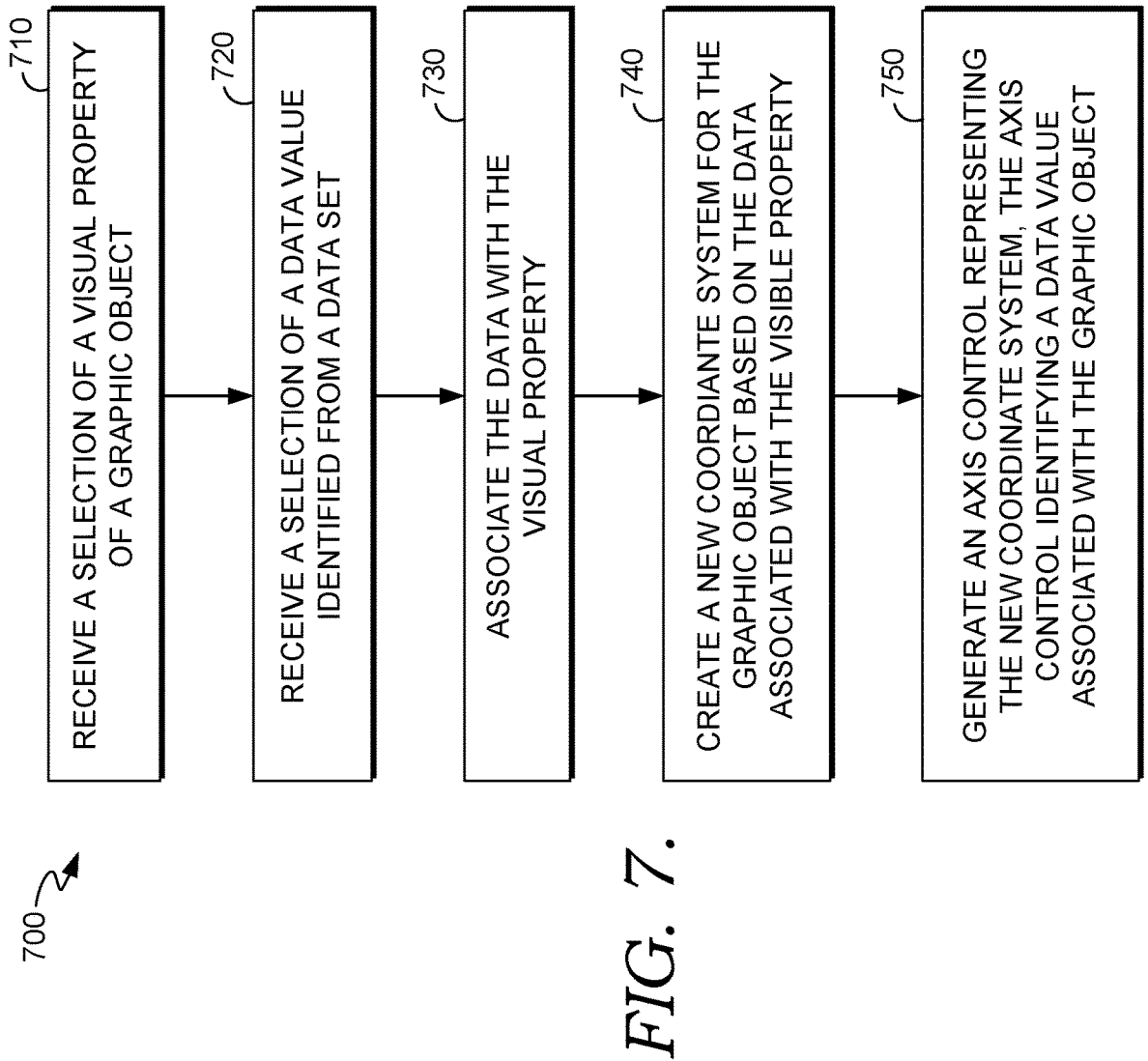
FIG. 7 depicts a block diagram illustrating an example method for creating an axis control for a data-bound graphic object, in accordance with various embodiments of the present disclosure.

FIG. 7 depicts a flow diagram illustrating a method 700 for creating an axis control for objects bound to data in accordance with embodiments of the disclosure. Method 700 may be performed in whole or in part by data-bound axis module 114 of FIG. 1. At step 710, a selection of a visual property of a graphic object is received, and at step 720, a selection of a data value identified from a data set is received. The data value may be selected via selection of a data variable to which the data value belongs. At step 730, an association between the selected visual property and the selected data is created. Receiving the selections of the visual property and data value and associating the visual property and the data may be done as described in detail with respect to FIG. 2 and FIGS. 3A-E.

Next, at step 740, a new coordinate system is created for the graphic object based on the data associated with the visible property. The origin for the new coordinate system is defined by the current position of the graphic object within the graphic user interface. Specifically, the origin may be set to a particular portion of the graphic object based on the type of coordinate system created. For instance, for an X-axis linear coordinate system, the origin point may be automatically set to a left edge or side of the graphic object and may be switched to the right edge or side of the graphic object, whereas, for a polar coordinate system, the origin may be the center of the graphic object. In this way, the position of any other portion of the graphic object may be defined with respect to the new origin point. This new coordinate system may be considered as a secondary coordinate system that is used in addition to the primary coordinate system that is automatically applied to the entire canvas. The new coordinate system may be applied to one or more graphic objects that are bound to data. When the objects are bound to data, the origin of the new coordinate system is still determined by the position of the graphic object while the dimensions are determined by the data values bound to the object.

At step 750, an axis control for the graphic object is generated to represent the new coordinate system. As such, the axis control is based on the association between the visual property and the data. In exemplary aspects, the new coordinate system and axis control may be automatically generated whenever data is bound to a graphic dimension or a position. The axis control that is created is presented for display on a graphical user interface with the graphic object. The axis control identifies a variable value associated with at least one displayed graphic user interface that is bound to the data variable. Additionally, the axis control is adjustable such that is can be expanded or compressed. When the axis control is adjusted, a displayed graphic object's property value for the selected visual property is automatically adjusted in proportion to the adjustment of the axis control. Accordingly, the axis control may be used to adjust the scale of one or more graphic objects bound to data. There may be multiple axes created based on multiple bindings between variables and visual properties, and each axis may be displayed with the graphic object.

Figure 8A:
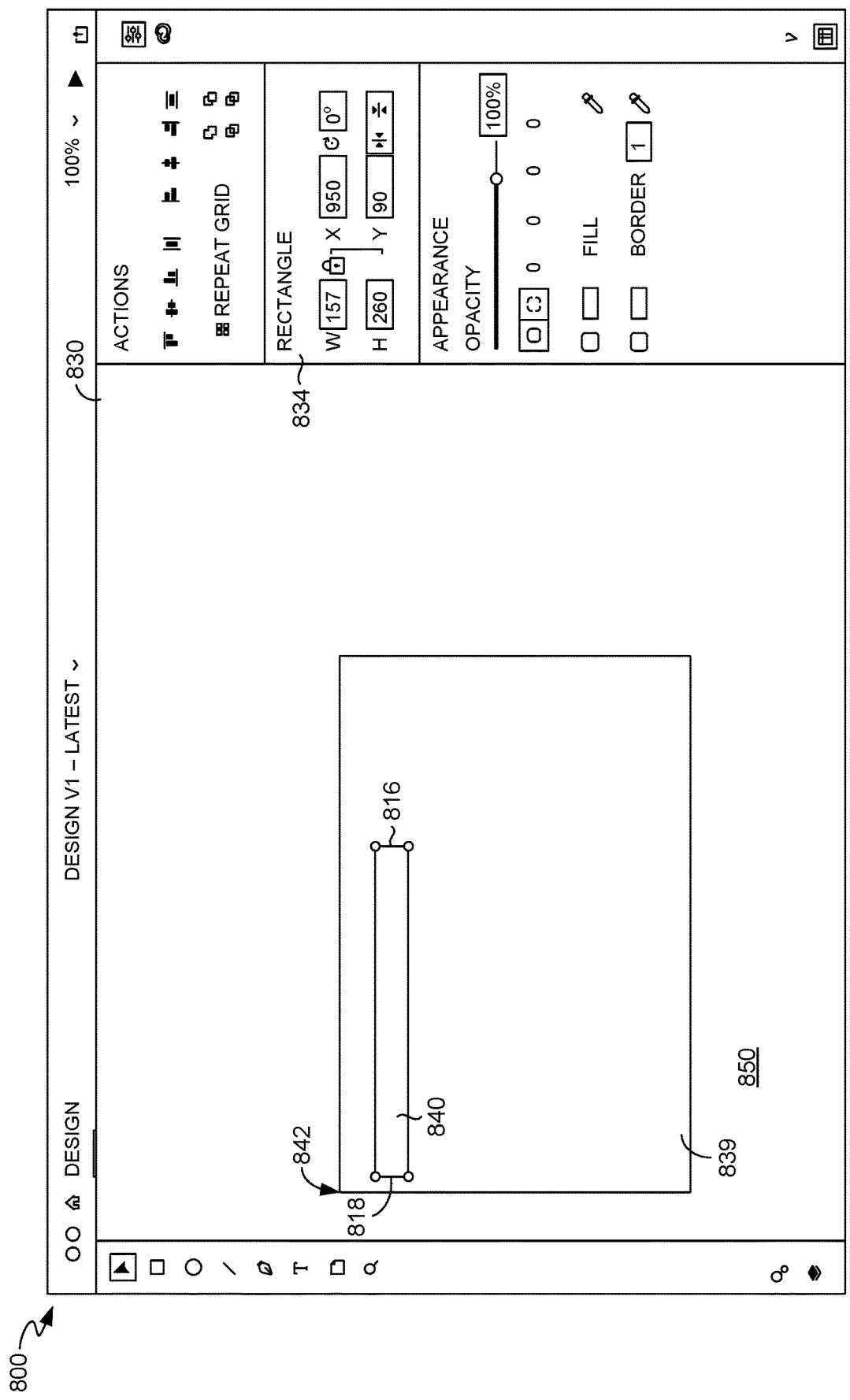
FIGS. 8A-F depict an example graphical user interface environment with an axis control for adjusting a data-bound graphic object, in accordance with various embodiments of the present disclosure.

FIGS. 8A-F illustrate an example axis control created for rectangle object 840 bound to the data set imported in FIG. 3B. FIG. 8A depicts graphic object 840 having a rectangular shape having a first end 818 on the left side and a second end 816 on the right side. In FIG. 8A, graphic object 840 is not bound to data, and only the default coordinate system with the upper-left corner 842 as the origin applies. As indicated by the transformations area 834, the graphic object 840 is defined with the X,Y coordinate position (950,−90), which is measured from the default origin position 842. In this example, the displayed coordinate position is for a point along the second end 816 of the graphic object 840; however, the position of other portions of the object 840, such as a center of the object, may be displayed instead.

Figure 8B:
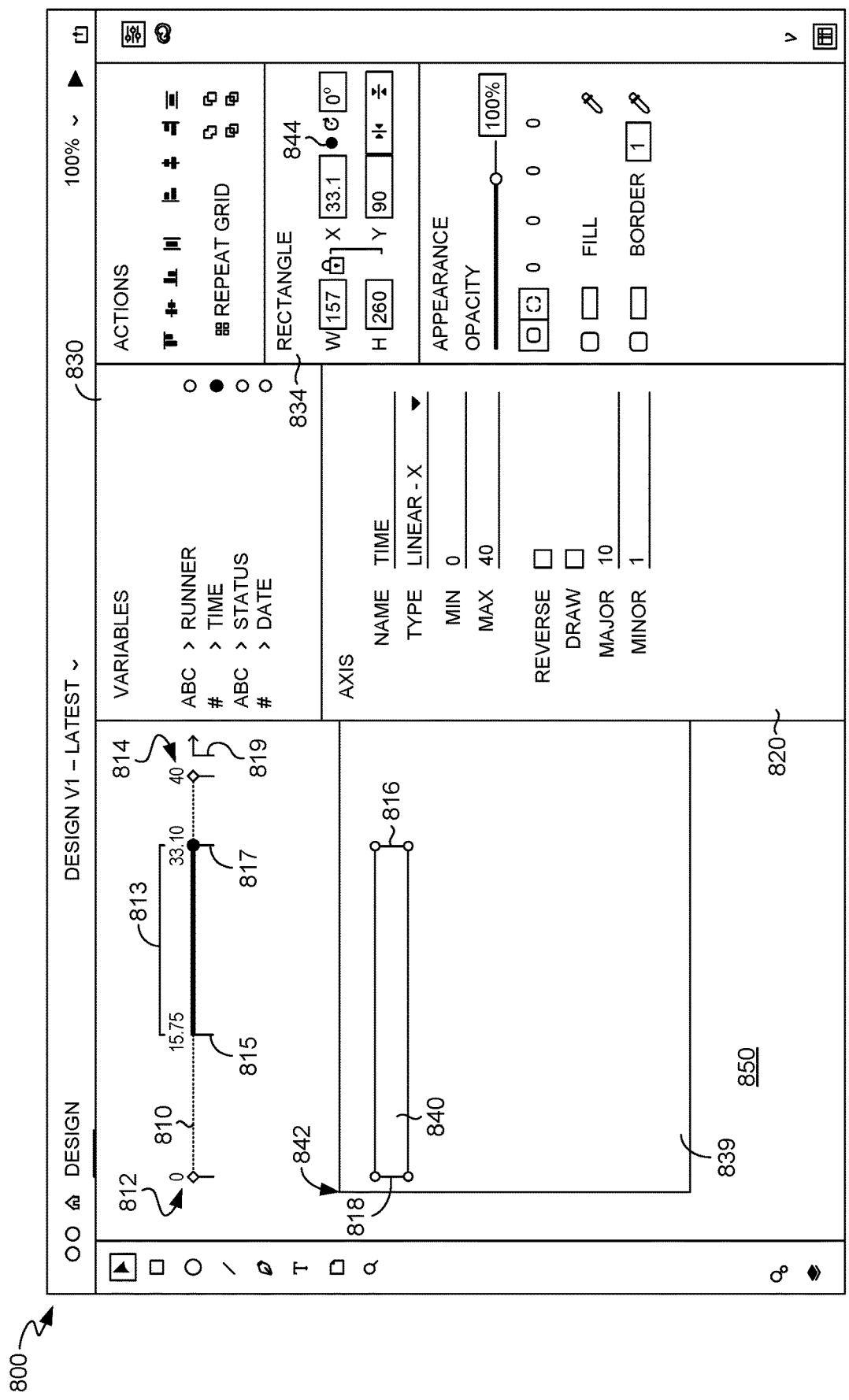

Turning to FIG. 8B, a visual property of graphic object 840 is associated with a variable and an axis control 810 is created. Specifically, the X-axis position of the second end 816 on the graphic object 840 is associated with the time variable in the data set, as indicated by the variables area 830 of the GUI environment 800. The association of the visual property and variable data may be done in a similar manner explained with respect to FIG. 2 and FIGS. 3A-E. Because the visual property bound to data is a position in FIG. 8A, a new coordinate system represented by axis control 810 is generated to represent at least the range of variable values in the data set for the time variable. The axis control 810 may be presented on the workspace area 850 of GUI environment 800.

In exemplary aspects, the type of coordinate system created and, consequently, the orientation of axis control 810 are determined based on at least the visual property selected. For a data binding to an X-axis position, a linear X-axis system, such as the one represented by axis control 810, is created, and a similar linear X-axis system may be created for bindings to a width of a graphic object. A linear Y-axis is created for bindings to the Y-axis position or the height of a graphic object, and either an X-axis or Y-axis control may be created for the radius or diameter property of a circular graphic object. While the X-axis and Y-axis are controls created for a Cartesian coordinate system, it is contemplated that axes for other types of coordinate systems, such as a polar coordinate system, may be generated in accordance with embodiments of the disclosure.

The origin point of the new axis system is determined from the current position of the graphic object 840, with the specific portion being based on the type of system created. For instance, for X-axis systems, the origin may be based on either a right side or a left side of the object, while the origin for a Y-axis system may be based on either a top side or bottom side of the object. In some embodiments, the default origin is the right side and the bottom side for X-axis and Y-axis, respectively, but may be adjusted by the user.

Accordingly, for graphic object 840 having the X-position of the second end 816 bound to data, the newly created coordinate system has its origin position where x=0 at the first end 818 of the graphic object 840. The X-position of the second end 816 may be defined as units from the origin based on the data value bound to the second end 816. For example, where graphic object 840 is bound to the time variable in spreadsheet 320 in FIG. 3B and corresponds to the first observation, the X-axis position of the second end 816 is defined, under the new coordinate system, as 33.1 units from the new origin. This new coordinate position is shown in the transformation area 834. Notably, the Y-axis position is the same Y-axis position using the default coordinate system in FIG. 8A because the newly created coordinate system is only an X-axis system and, therefore, provides only new X-axis values. Additionally, while graphic object 840 is defined with new X-axis values, graphic object 840 is still within the same position on the canvas 839 that it was in FIG. 8A. Accordingly, graphic object 840 may still also be defined with the same coordinate positions in FIG. 8A. Accordingly, property values for the graphic objects may be given in either the default coordinate system that applies to the entire canvas 839 (sometimes referred to herein as the primary coordinate system) or the newly created coordinate system specifically for the graphic objects (sometimes referred to herein as the secondary coordinate system). Because both of the coordinate systems may be applied, in some embodiments, transformation areas 834 provides a visual indicator, such as indicator 844, to signal that the displayed position is based on a secondary or special coordinate system.

Further, the axis control 810 is created as a representation of the new coordinate system that may be used to adjust graphic objects subject to the new system, such as graphic object 840. Similar to graphic object 840, axis control 810 includes a first end 812 representing an axis minimum and an opposite second end 814 representing an axis maximum. The first end 812 of axis control 810 aligns with the new origin of the newly created coordinate system, which is the first end 818 of graphic object 840, and extends at least until the second end 816 of the graphic object 840.

At least a portion of the axis control 810, such as bolded portion in FIG. 8B, represents the range of values of the variable 813 bound to the visual property. The variable range 813 is between the lowest variable value identified in the data set, represented by point 815 on axis control 810, and the highest variable value identified in the data set, represented by point 817 on axis control 810. The variable range 813 on the axis control 810 is visually represented by visual property values similar to the visual property values used for objects bound to the variable. For instance, the range of X-axis positions on the linear X-axis control 810 (also referred to herein as a horizontal axis control) are the X-axis position values determined for graphic objects bound to the data, such as graphic object 840, as explained with reference to method 200 of FIG. 2. In the example illustrated in FIG. 8B, graphic object 840 corresponds to the first observation in spreadsheet 320 in FIG. 3B, and consequently, the X-axis position of the second end 816 of the graphic object 840 represents a time variable value of 33.10 minutes. The other X-axis position values for existing or potential graphic objects corresponding to other observations are used for the variable range 813 of the X-axis control 810. In some aspects, the variable value of a selected graphic object (also referred to as the "current variable value") may be visually presented along the variable range 813 of axis control 810 displayed on the graphic user interface 800. The selected graphic object 840 in FIG. 8B corresponds to the observation with the maximum variable value (33.1 minutes) and, therefore, is identified at the variable maximum position on axis control 810.

In exemplary embodiments, the axis control 810 extends beyond the values for the graphic object 840. In other words, the range of the axis control 810 is greater or less than the variable range. The axis minimum, for instance, may comprise the lowest possible variable value and need not comprise a variable value actually present in the data set. In some embodiments, a default axis minimum for variables with positive integers is set to zero. The first end 812 representing the axis minimum of axis control 810 aligns with the first end 818 of the graphic object 840, which does not have its position directly bound to the time variable.

As the second end 816 of the graphic object 840 is bound to the variable, the axis maximum on the second end 814 of axis control 810 is at least the variable maximum. In some embodiments, the axis maximum is a greater than the variable maximum. For instance, the axis maximum may be the greatest variable value identified in the data set (i.e., the variable maximum) rounded up to the nearest tenth or hundredth, for example. In FIG. 8B, the axis maximum is 40 minutes, which comprises the highest variable time value of 33.1 rounded up. Because the range of the axis control 810 extends beyond the variable range, the variable range may be visually distinct from the rest of the axis range to allow a user to easily identify the variable range. Axis control 810 in FIG. 8B includes a solid, bold line segment for the portion representing the variable range 813, and dotted line segments for portions of the axis range extending beyond the variable range.

In some aspects, the axis maximum and minimum are automatically set but may be modified by the user. GUI environment 800 in FIG. 8B, for example, includes an axis area 820 identifying attributes of axis control 810. Axis area 820 may include fields for a user to enter or modify the minimum and maximum axis values.

Figure 8C:
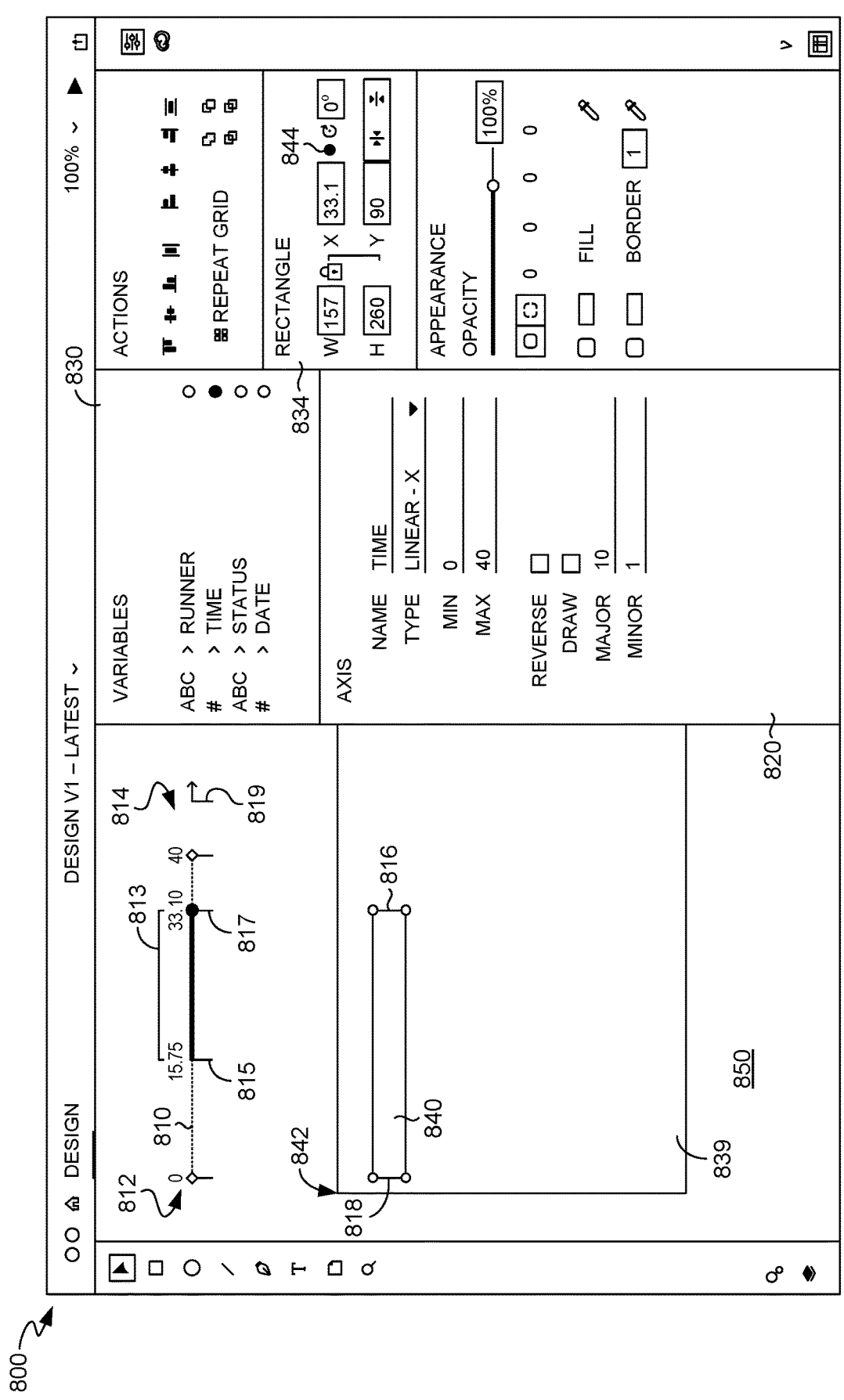

Axis control 810 is initially created based on the graphic object 840 that is created and bound to data. A user may directly manipulate axis control 810 to change the size and/or position of the graphic objects within the default coordinate system, as shown in FIG. 8C. FIG. 8C depicts the same graphic object 840 and axis control 810 as in FIG. 8B, except that a user has adjusted the length of axis control 810. A user may adjust the length of axis control 810 by using the cursor to manually move an end, such as first end 812 or second end 814 of axis control 810. Axis control 810 in FIG. 8C may have been shortened by a user sliding second end 814 closer to the first end 812. The X-axis position of the second end 816 of the graphic object 840 is also changed proportionately to the axis control 810. For instance, if the user shortened axis control 810 to half its original length, graphic object 840 may be shortened to half its original length.

The shortened axis control 810 still represents the same secondary coordinate system as in FIG. 8B and, therefore, represents the same axis range values. Accordingly, the coordinates defined by the new, secondary coordinate system may remain the same, as shown in transformations area 834 in FIG. 8C. While the coordinates within the new coordinate system are the same, the graphic object was adjusted within the larger canvas 839 by adjusting the axis control 810 and, as such, has different coordinates for the default coordinate system applicable to the entire canvas

Figure 8D:
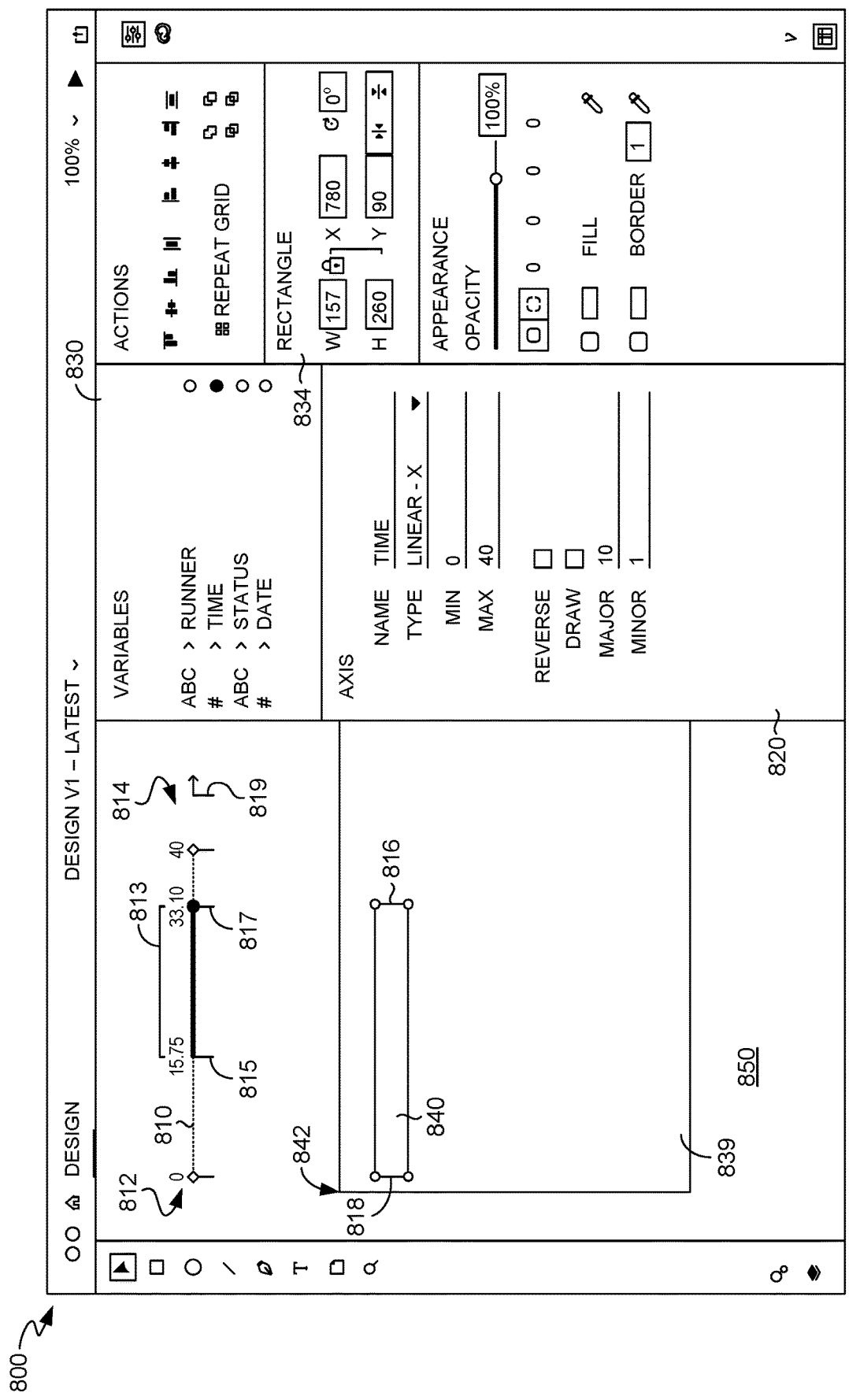

839. For example, FIG. 8D illustrates the same graphic object 840 and axis 810 as shown in FIG. 8C except the coordinate position in the transformations area 834 has been changed to reflect the default coordinate system, as illustrated by the absence of visual indicator 844. The transformations area 834 in FIG. 8D shows the second end 816 (i.e., the right side) of graphic object 840 being at (780,−90), which is different than the original position within the default coordinate system provided in FIG. 8A.

The change in visual property values for the graphic objects resulting from a user's adjustment of the axis control applies to all graphic objects subject to the same data bind. Turning briefly to FIGS. 9A-D, for example, an example GUI environment 900 includes a plurality of triangular-shaped graphic objects 940 on canvas 939. Each graphic object 940 has a height linked to a distance variable in an imported data set, as indicated in variables area 930. By binding the height of graphic objects 940 to the distance variable, a new Y-axis system and corresponding linear Y-axis control 910 (also referred to herein as a vertical axis control) are created. The new origin for the new coordinate system is set to the bottom of the graphic objects 940, which are aligned with one another, and provides secondary Y-axis positions to the graphic objects 940. For example, compare the Y-axis positions for the top point of graphic object 940A displayed in the transformations area 934 in FIGS. 9A and 9B. In 9A, the position is provided using the default coordinate system (250,−430), while a position (250, 8848) reflecting the new coordinate system based on data values is provided in FIG. 9B.

The Y-axis control 910 generated for the new coordinate system has a first end 914 and a second end 912. Unlike with axis control 810, the axis maximum at the second end 912 of axis control 910 is the variable maximum. As such, the peak of the tallest graphic object 940 is aligned with the second end 912. Additionally, unlike axis control 810, axis control 910 in FIGS. 9A-B does not include a visual indicator of the variable range; however, it is contemplated that other embodiments of a Y-axis control may indicate the variable range.

Figure 9A:
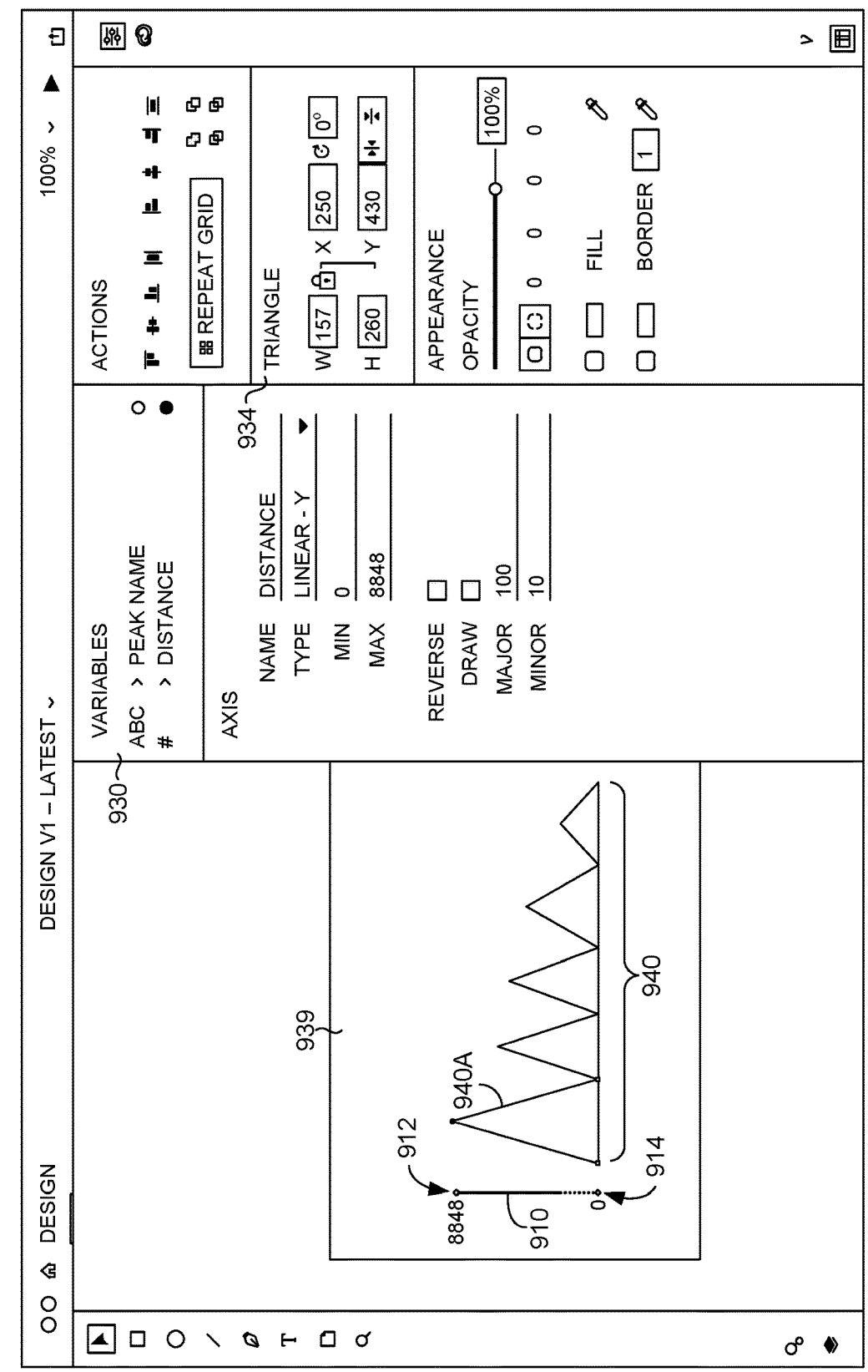
Figure 9B:
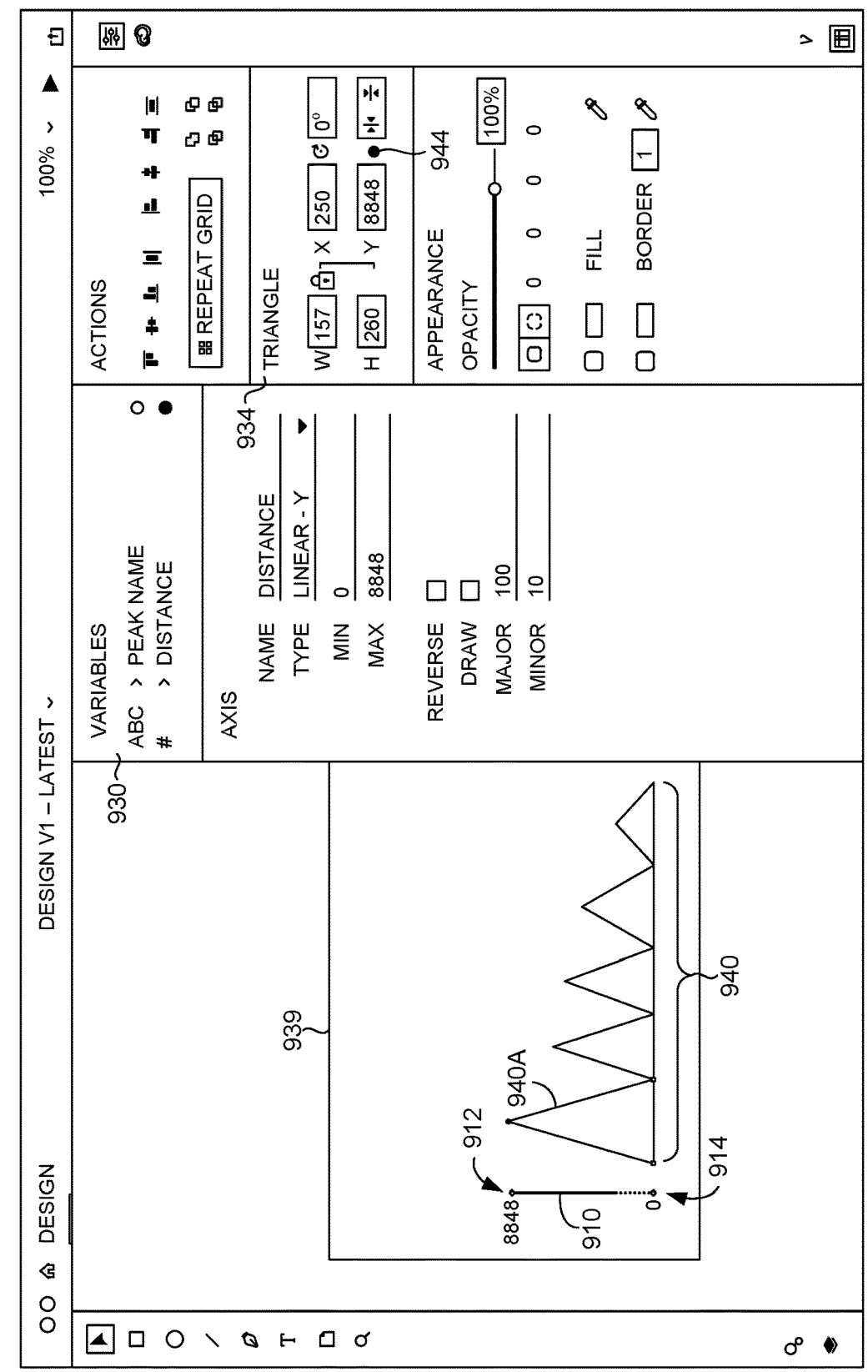
Figure 9C:
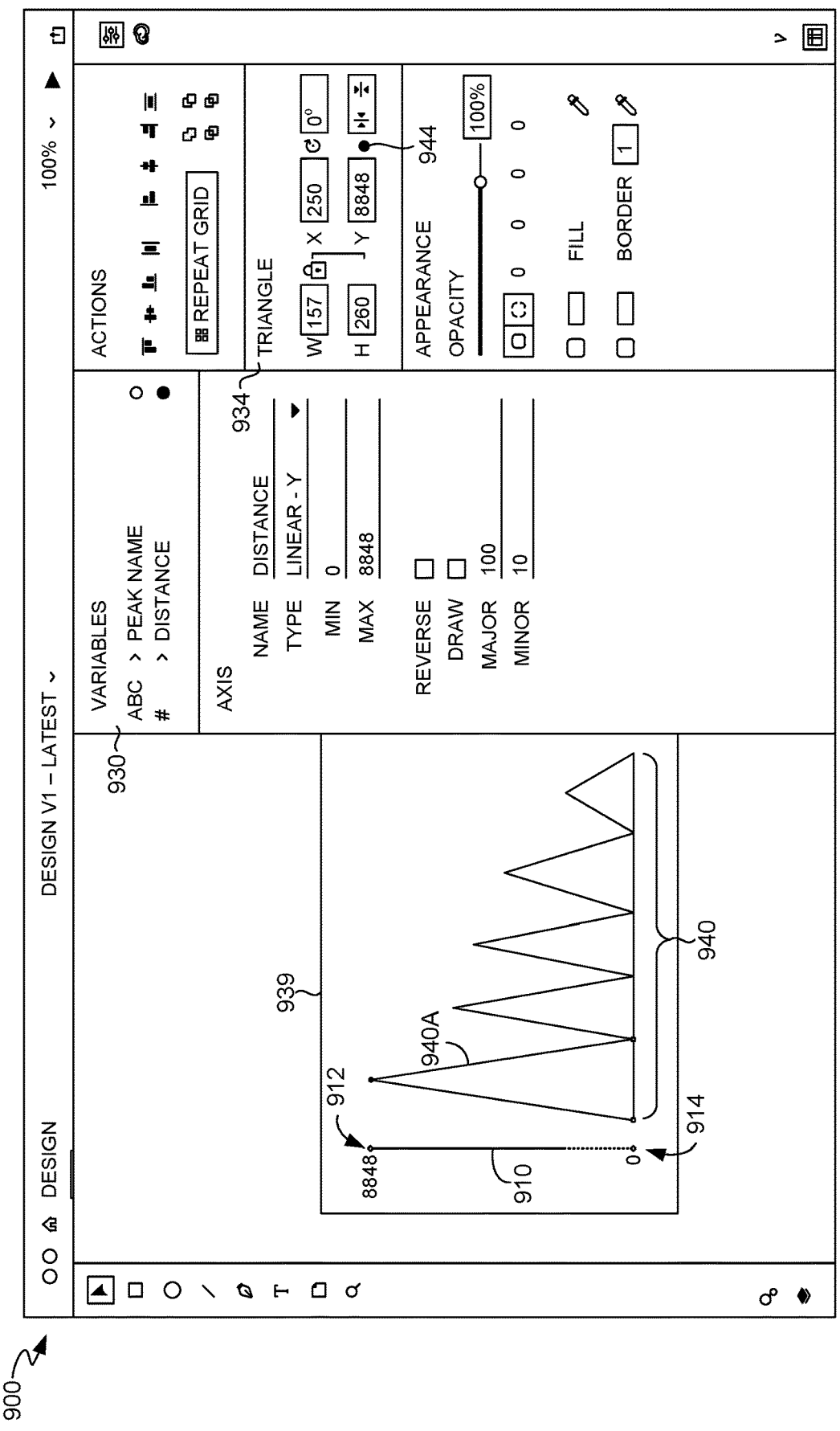
Figure 9D:
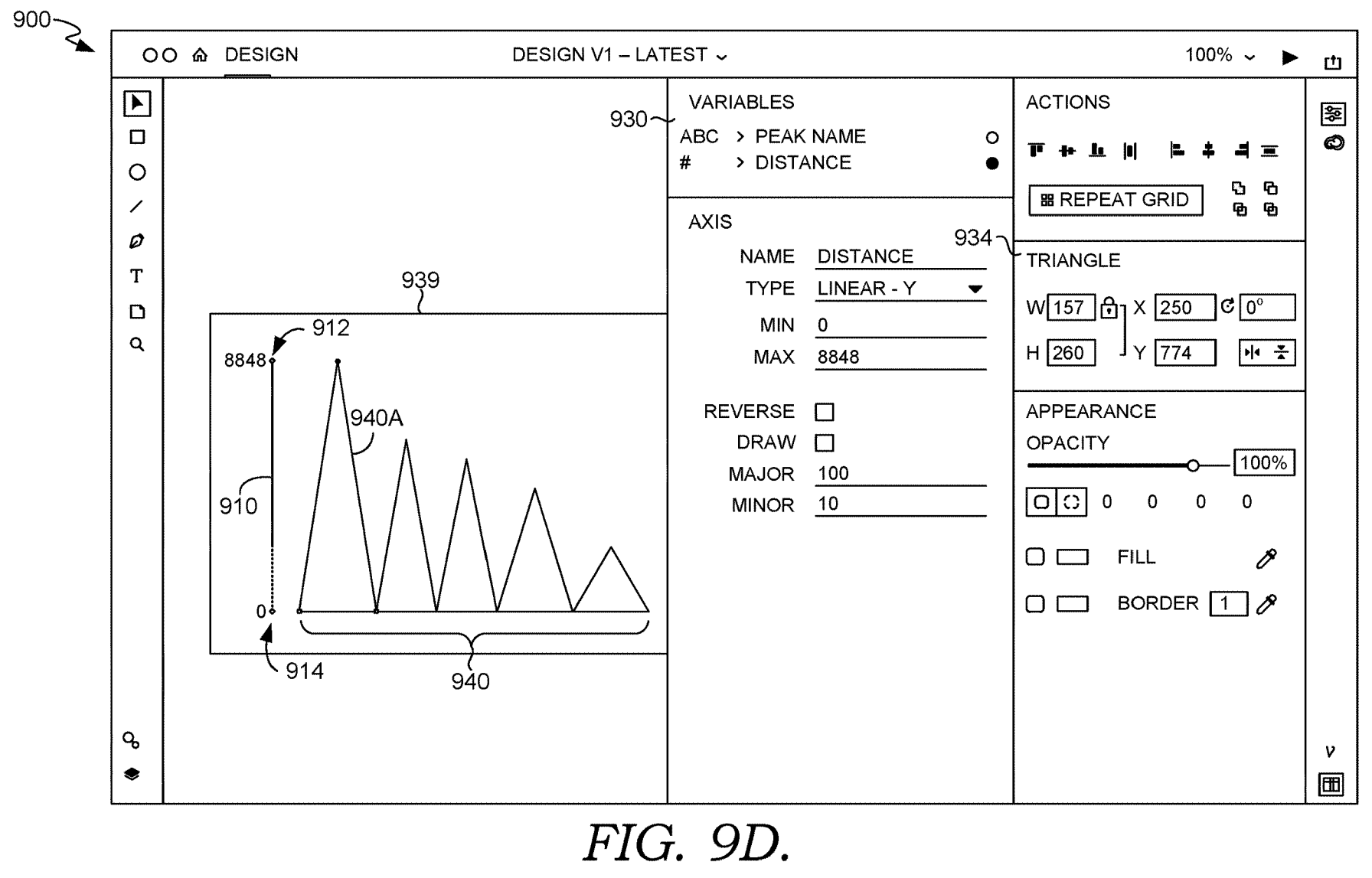

In FIGS. 9C-D, axis control 910 has been lengthened by, for example, a user manually moving the second end 912 away from the first end 914. The adjusted axis control 910 still represents the same range of variable values, and, therefore, the position values of the graphic objects 940 under the secondary coordinate system remains the same as shown by the coordinates in FIG. 9C being the same as in FIG. 9B. At the same time, the height of the axis control 910 and the graphic objects 910 were changed relative to the rest of the canvas 939. Specifically, the change to the axis control 910 resulted in a proportional change to the heights of all the graphic objects 940, thereby creating new positions for the graphic objects 940 under the default coordinate system for the canvas. For example, the transformations area 934 in FIG. 9D provides a different Y-axis values for the default coordinate system than what was provided in FIG. 9A.

When any additional graphic objects are created to correspond to other observations, the position of the new graphic object may be determined by matching the data value for the associated variable along the axis control 910. The new object may be provided a position within the default coordinate system (i.e, the primary coordinate system for the entire canvas) that is proportionate to the adjusted positions of the graphic objects 940 in FIGS. 9C-D rather than the original positions of the graphic objects 940 in FIGS. 9A-B. Accordingly, binding a visual property of objects to a variable creates a fix proportional relationship between visual properties of objects, and the axis control 910 representing a coordinate system defined by the variable values allows the user to adjust the scale of the objects without disrupting the relationship to the data.

Figure 8E:
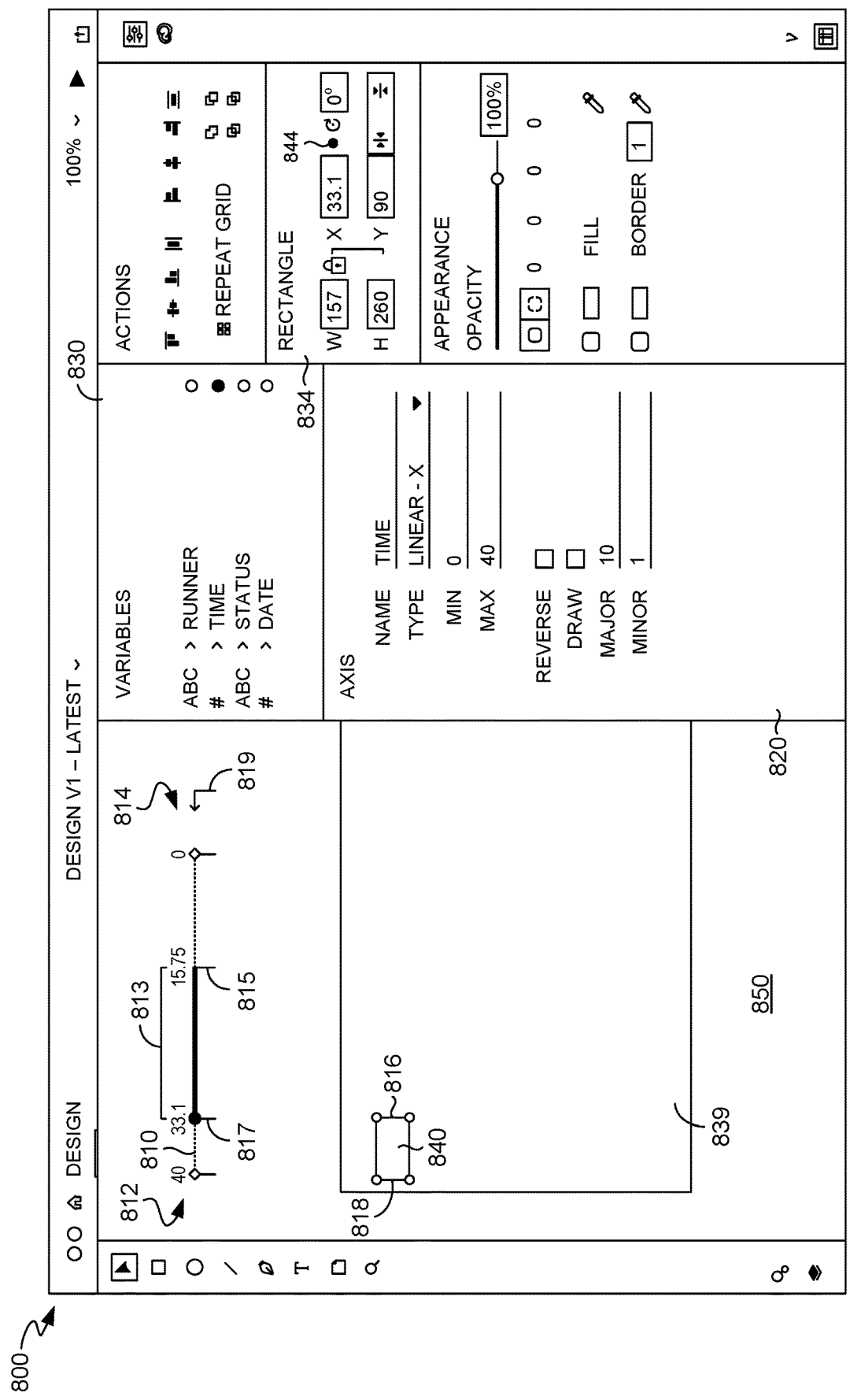
Figure 8F:
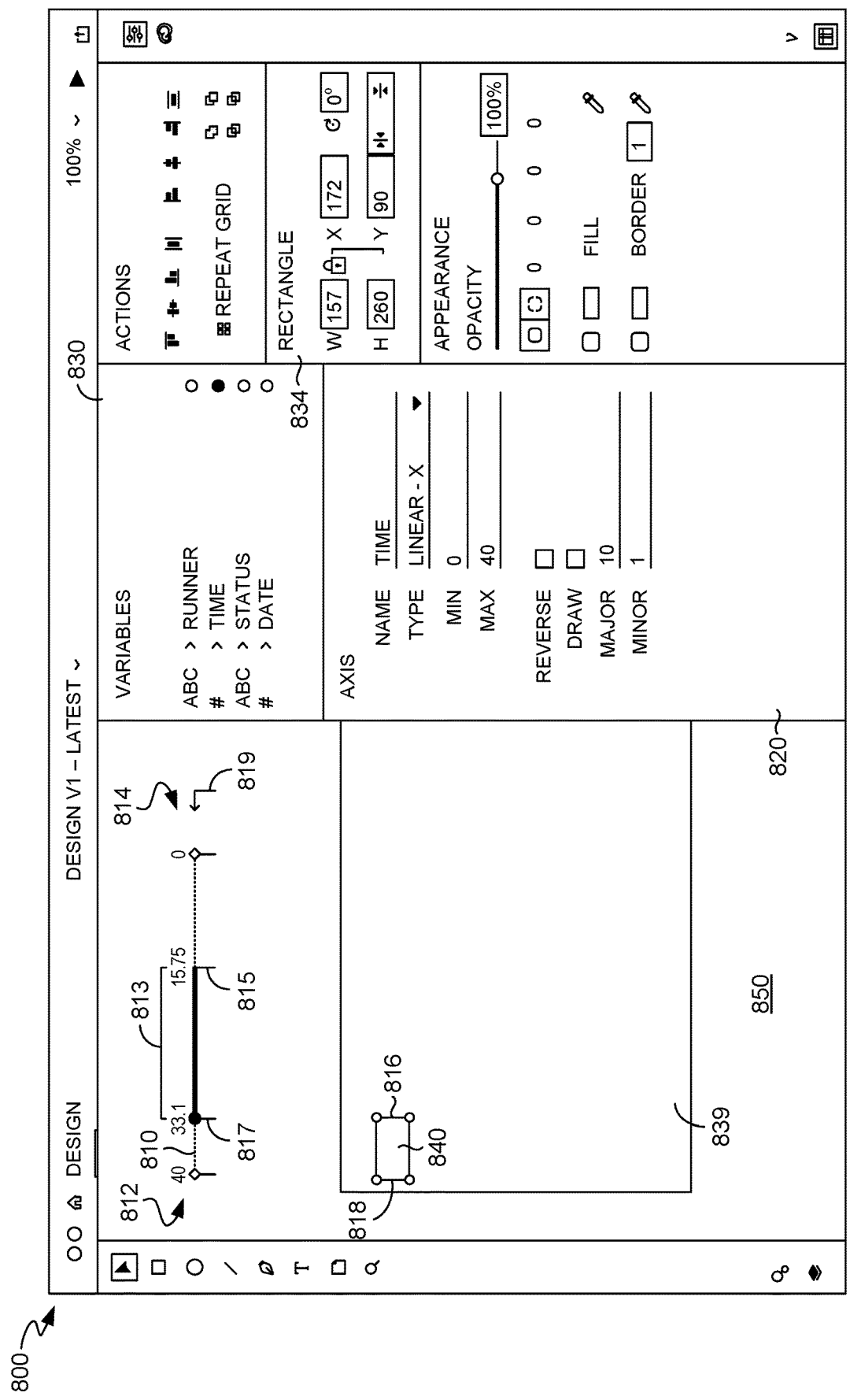

Returning to FIGS. 8A-D, as previously mentioned, the origin point for the new coordinate system and, consequently, the start of axis control 810 is based on the position of the first end 818 of the graphic object 940, and the axis values increase towards the opposite end. A user, however, may want to flip the direction of the axis such that the axis maximum aligns with the first end 818 of graphic object 940, as shown in FIGS. 8E-F. With the flipped axis control 810, the first end 812 of axis represents the axis maximum, and the second end 814 represents the axis minimum. As shown in FIG. 8E, the X-axis maximum for the new coordinate system is "40" and is now aligned with the first end 818 of graphic object 840, and the coordinate system values decrease to "0" as axis control 810 extends towards the right side.

The first end 818 of graphic object 840 is not bound to data and, therefore, can retain its position on the canvas while being aligned with the axis maximum value of "40". Because the second end 816 of the graphic object 840 is bound to the data reflected in the secondary coordinate system, the position of the second end 816 remains aligned with the same corresponding data value on axis control 810, resulting in the same coordinate position within the secondary coordinate system as shown in FIG. 8E. However, because flipping the axis control 810 resulted in a different placement of the corresponding data value (33.1) within the canvas 839, the first end 816 of graphic object 84 is moved on the canvas 839 to stay aligned within the corresponding data value on the flipped axis control 814. As such, FIG. 8F depicts the coordinate position for graphic object 840 within the default coordinate system as different values than the position provided in FIG. 8D. As illustrated in FIGS. 8E-F, this movement of first end 816 relative to the second end 818, which is not bound to data, results in the shortening of the width of graphic object 840. In this way, flipping the axis control 810 may be used to visually illustrate inverse data values, such as distance from the maximum values rather than distance from minimum values. The flipped axis control 810 may be manipulated by the user to adjust the visual property values of the graphic object 840 within the default coordinate system in a similar fashion described with respect to FIGS. 8A-D.

Axis control 810 is used for adjusting the scale of the graphic objects relative to the rest of the canvas 839 and, in this function, is not part of the visualization being created. In some embodiments, a drawn axis for the visualization, however, may be created using the axis control 810. For example, axis area 820 of GUI environment 800 may further include an option for drawing an axis corresponding to axis control 810 onto the canvas 839. As illustrated in FIGS. 8E-F, axis area 820 may include fields for the user to set or adjust major and/or minor tick marks for the drawn axis.

Data-Bound Object Anchors

In creating digital designs, there may be multiple types of graphic objects that are grouped together or are otherwise related, and the user may want the related graphic objects to be placed adjacent one another. For example, there may be a geometrical shape, such as a bar, and a text box object labeling the bar or symbol otherwise identifying the bar. Throughout the design process, a user may make several adjustments to the positions of one of the graphic objects that would necessitate adjustments to the related object. Similarly, the position of a graphic object that is bound to data may change as the data changes, and consequently, a user may want the related object to move positions. Accordingly, aspects herein are directed to maintaining a defined spaced relationship between at least two graphic objects when the objects are moved within the graphical user interface.

Figure 10:
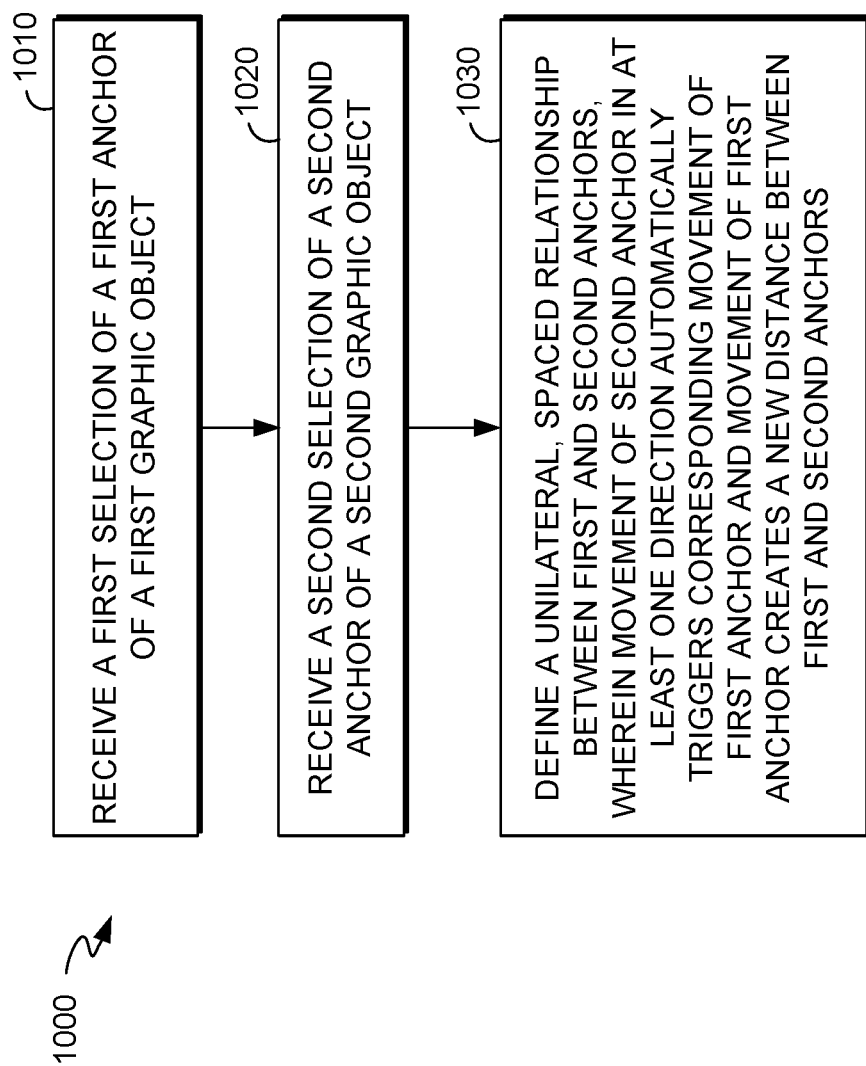
FIG. 10 depicts a block diagram illustrating an example method for automatically repositioning a graphic object based on a fixed, unilateral spatial relationship with another graphic object, in accordance with various embodiments of the present disclosure.

FIG. 10 provides a block diagram illustrating an example method 1000 for maintaining the spaced relationship between graphic objects using anchors on the objects. As used herein, an anchor (also referred to as an anchor point) is a start or end point of a line segment that forms a portion of a graphic object or a bounding box containing one or more graphic objects. An anchor may represent end points of an object itself, such as a line, or may connect two segment portions. Anchors may be placed anywhere on a path where there are two curved or straight segments connect to create a smooth line and may be placed where two straight or curved segments connect to create a change in the path direction, such as a corner of an object or bounding box. While anchors are commonly on the perimeter of a graphic object or bounding box, there may also be internal anchors placed within inside of the object or bounding box. For instance, there may be an internal anchor located at the center of an object or bounding box. At least some anchors at pre-defined areas, such as corners and end points, are created when a graphic object is drawn, and, in exemplary embodiments, the user can add additional anchors, which may be referred to as special anchors. Special anchors may include anchors along the perimeter or internal anchors.

When an object is bound to data, one or more anchors may be a data anchor, indicating that the position of the anchor is bound to data. Anchors may be adjusted through direct user manipulation using a cursor, for instance; however, in some aspects, data anchor are adjustable only through a change in the data value bound to the anchor such that the data anchors cannot be manipulated directly by the user.

Anchors may be used to change the shape and/or size of an object by direct user manipulation, for instance. In embodiments of the disclosure, anchors may further be used to define a spaced relationship between two objects such that the spaced relationship is maintained when an object or part of an object is moved within the GUI environment. To create this spaced relationship, starting at step 1010 in FIG. 10, a selection of a first anchor on a first graphic object is received, and then a selection of a second anchor on a second graphic object is received at step 1020. The selections of the anchors are performed in a manner to request a relationship between the two anchors. In some embodiments, for instance, a user may use a cursor to click on the first anchor and drag the first anchor over to the second anchor. In other embodiments, the user may press a hot key, such as the "control" key while selecting the first and second anchors.

Based on the selection of the first and second anchors, a spaced relationship between the anchor points is defined, as provided in step 1030. This spaced relationship, also referred to herein as an offset relationship, between the first and second anchors is maintained when the second anchor is moved independently of the first anchor such that movement initiated by the second anchor triggers a corresponding movement of the first graphic object. This relationship, however, is unilateral in that it applies only in a direction between the second anchor to the first anchor. In other words, when an indication is received that the first anchor is moving independently of the second anchor, the second anchor maintains its position such that the distance between the first and second anchors is changed. Additionally, it should be noted that, as used herein, references to an anchor of a graphic object include an anchor associated with the graphic object, such as an anchor of a bounding box containing the graphic object.

FIGS. 11A-D depict a GUI environment 1100 that illustrate this relationship. The GUI environment 1100 includes a design canvas 1139 on which two types of objects are displayed: rectangle objects 1142 and 1144 and text objects 1146 and 1148. One of more of the types of objects may be bound to data variables. For instance, the position of the right sides of each rectangle object 1142 and 1144 is associated with the time variable, and the content of each of the text object 1146 and 1148 is associated with the status variable, as indicated in variables area 1130. The set of rectangle objects 1142 and 1144 and the set of text objects 1146 and 1148 may each have been created and bound to data in accordance with method 200 of FIG. 2.

Rectangle object 1142 and text object 1146 both correspond to a first observation in the linked data set, while rectangle object 1144 and text object 1148 both correspond to a second observation. Accordingly, the two types of objects are related and are paired together. This pairing may arise from rectangle object 1142 and text object 1146 being created in a cell or grouping of objects or may arise from a user specifically associating properties of each object 1142 and 1146 to values within the same observation. Rectangle object 1142 and text object 1146 form a first pair, and rectangle object 1144 and text object 1148 form a second pair. Because the objects within each pair are related, a user may want the graphic objects within each pair to be adjacent each other in the data-driven design.

Initially, the user may define this spaced relationship by manually positioning text object 1146 near the rectangle object 1142 at a desired distance. To maintain this spacing, the user creates a fixed spaced relationship by, for example, selecting anchor 1156 of text object 1146, and dragging the anchor 1156 to anchor 1152 of the rectangle object 1142. The selection of anchor 1156 and 1152 sets up a rule defining the position of anchor 1156 of text object 1146 by the position of anchor 1152 of rectangle object 1142 at least under certain circumstances. For instance, in exemplary embodiments, when there is movement of anchor 1152 of rectangle object 1142 initiated independently of the text object 1146, the position of anchor 1156 of text object 1146 is defined by the position of anchor 1152 of rectangle 1142 such that the distance 1140 between anchors 1152 and 1156 stays the same.

When there is movement of anchor 1156 of text object 1146 that is not a movement resulting from anchor 1152, the position of anchor 1156 is not tethered to anchor 1152 and, therefore, the anchor 1156 is moved without a corresponding movement of anchor 1152 such that the distance 1140 is not maintained. In this way, the anchor 1152 is considered "stuck" to another anchor in that its movement is always followed by movement of anchor 1152, while anchor 1156 is "free" in that, even though it automatically follows anchor 1152 in some circumstances, it can be moved freely without resulting in movement of anchor 1152. Because the anchor can be moved, the "stuck" anchor is not in a fixed position but, rather, it is considered "stuck" because it cannot be moved independently of the "free" anchor. In some embodiments, the "stuck" anchor is determined by the anchor that is selected second, but it contemplated that, in other embodiments, the "stuck" anchor is the anchor that is selected first. Distance 1140 between the anchors is shown in dashed line for purposes of the illustration, but it is contemplated that other embodiments of GUI environment 1100 does not have a line visually connecting the anchors.

As previously mentioned, the fixed offset relationship may be created between two graphic objects when at least one of those objects has a visual property bound to a data value. Further, when there are multiple graphic objects with the same visual property bound to a data variable, fixing a spaced relationship with at least one graphic object subject to the data binding automatically applies that relationship to other graphic objects subject to the same data binding. For example, the right side positions of rectangle object 1142 and rectangle object 1144 are both associated with the time variable. By creating a fixed spatial relationship between anchor 1152 of rectangle object 1142 and anchor 1156 of text object 1146, the spatial relationship is also applied to rectangle object 1144 and text object 1148. Specifically, the position of the anchor 1158 on text object 1148 is moved relative to the anchor 1154 of rectangle object 1144 such that the distance between anchor 1154 and anchor 1158 is equal to the distance 1140 between anchor 1152 and anchor 1156.

Figure 11B:
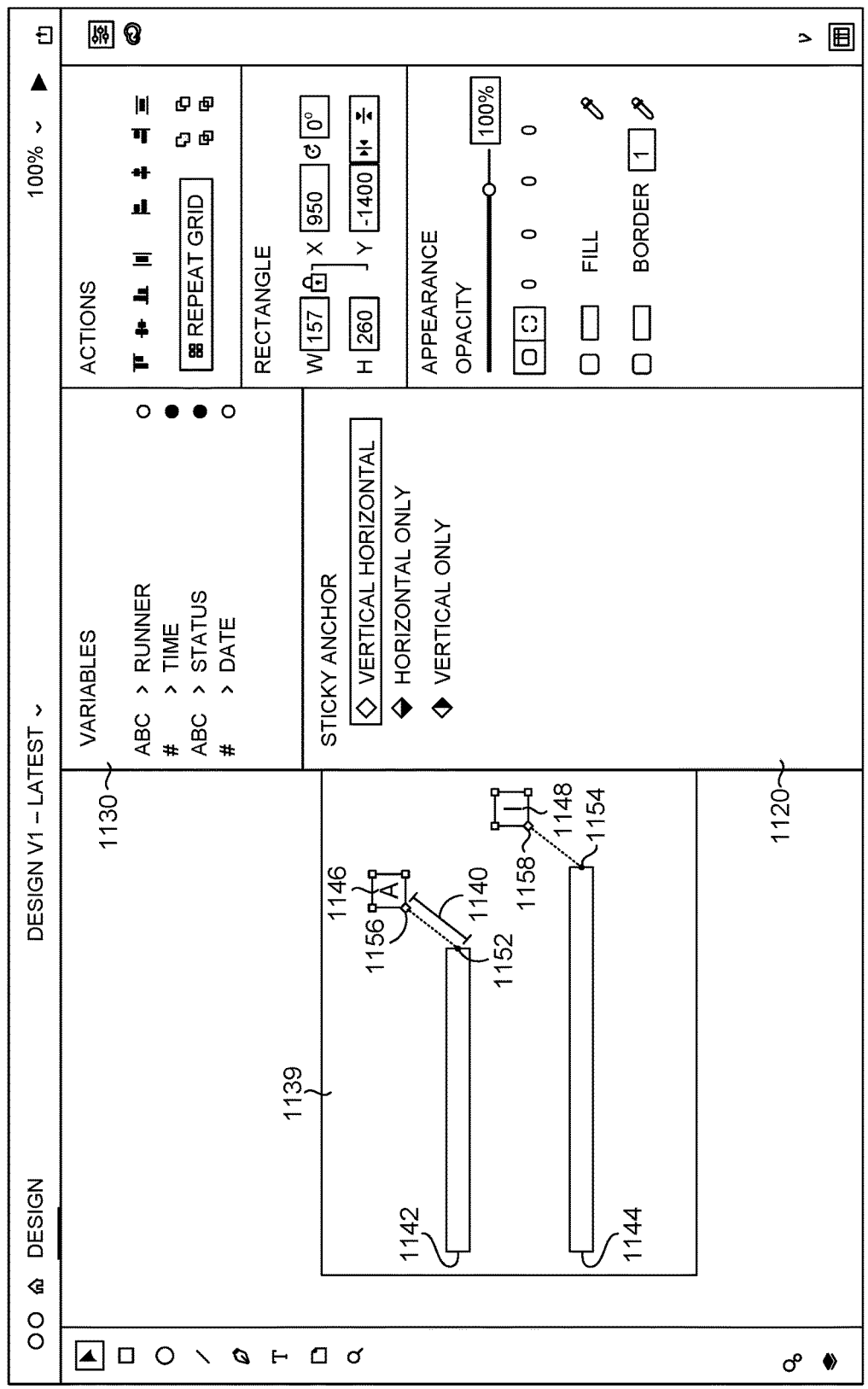
Figure 11C:
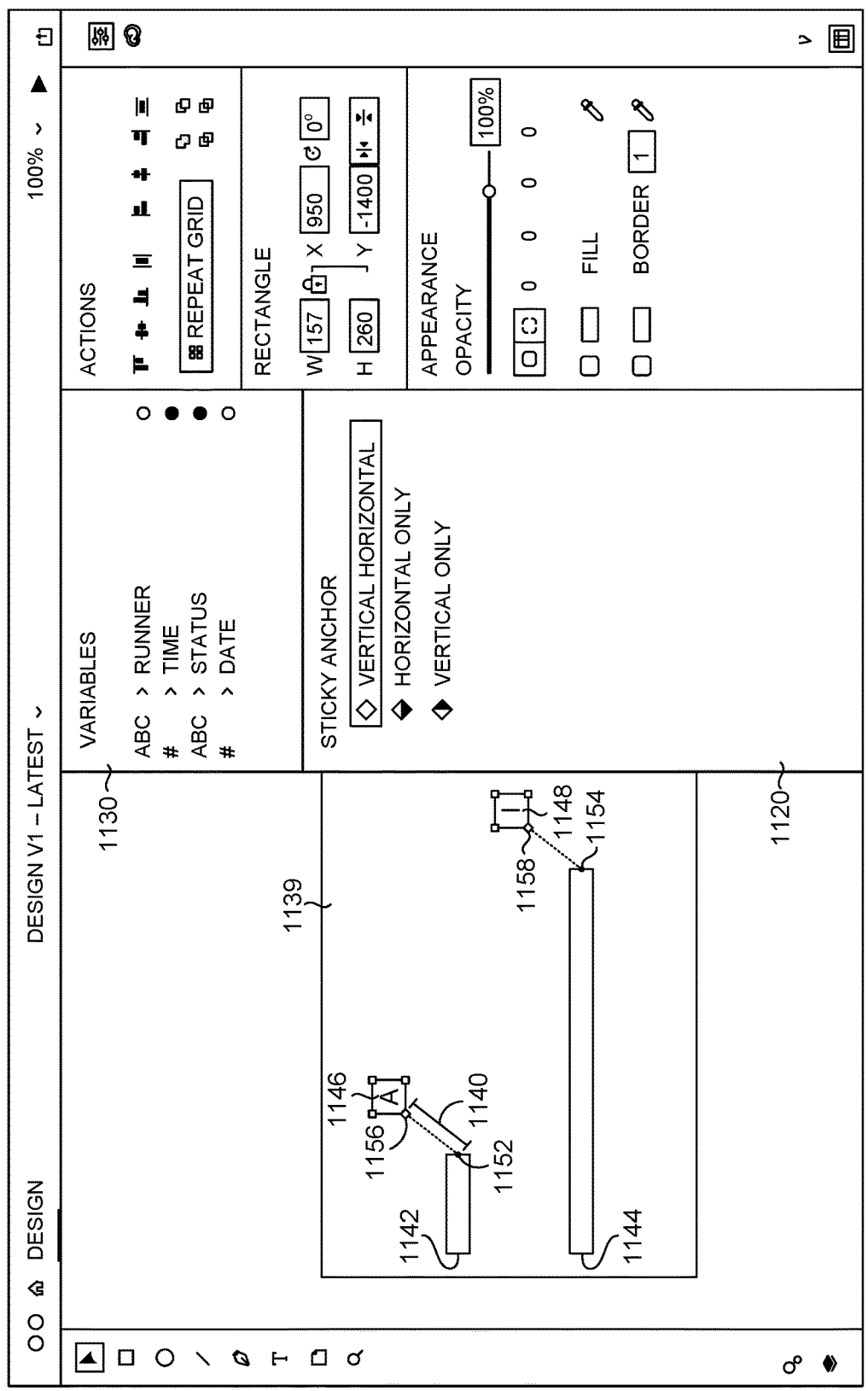

As mentioned, anchors 1156 and 1158 move with anchors 1152 and 1154, respectively, when movement of anchors 1152 and 1154 is initiated independently of anchors 1156 and 1158. Such movement may occur by manual movement of anchors 1152 and 1154 or automatic movement of anchors 1152 and 1154 as a result of a change in data associated with those anchors. These movements are illustrated in FIGS. 11B-C. In FIG. 11B, rectangle object 1142 has been moved upward, away from rectangle object 1144. This movement may have resulted from the user selecting rectangle object 1142 with the cursor and manually moving rectangle object 1142 and, therefore, anchor 1152, upward on the canvas 1139. Moving the rectangle object 1152 automatically triggers a corresponding movement of the text object 1146 so that the distance 1140 between anchor 1156 and anchor 1152 is equal to the distance 1140 in FIG. 11A when the fixed spatial relationship was defined. In this way, the position of anchor 1156 of text object 1146 is defined by the new position of anchor 1152, which was determined by the user's manual movement of rectangle object 1142.

FIG. 11C further illustrates the spaced relationship being maintained when the "stuck" anchor 1152 is moved horizontally. In FIG. 11C, the X-axis position of anchor 1152 has been changed such that the length of rectangle object 1142 has been shortened. As the X-axis positions of the right sides of rectangle objects 1142 and 1144 are bound to the time variable, this change in position may have occurred automatically as a result of the change in the variable value for the observation corresponding to rectangle object 1142. The change in position of anchor 1152 automatically changes position of anchor 1156 of text object 1146 such that the distance 1140 between anchor 1156 and anchor 1152 is equal to the distance 1140 in FIG. 11A. In this way, a user can choose a desired distance between related objects, such as rectangle object 1142 and text object 1146, and if the data affecting the position of rectangle object 1142 is changed, the user need not re-adjust the spacing of the objects to maintain the original design.

In FIGS. 11B and 11C, only one pair of objects (rectangle object 1142 and text object 1146) corresponding to one data observation has been moved while the other pair of objects (rectangle object 1144 and text box 1148) has remained stationary. In embodiments in which an axis control, such as axis control 810 of FIG. 8, is created, a user can adjust the scale of rectangle objects 1142 and 1144 such that anchors 1152 and 1154 on rectangle objects 1142 and 1144, respectively, can simultaneously be moved in the horizontal direction by the user. Such movement of anchors 1152 and 1154 would automatically change the position of anchors 1156 and 1158 on text objects 1146 and 1148, respectively, to maintain distance 1140 in accordance with the defined spaced relationship.

Figure 11D:
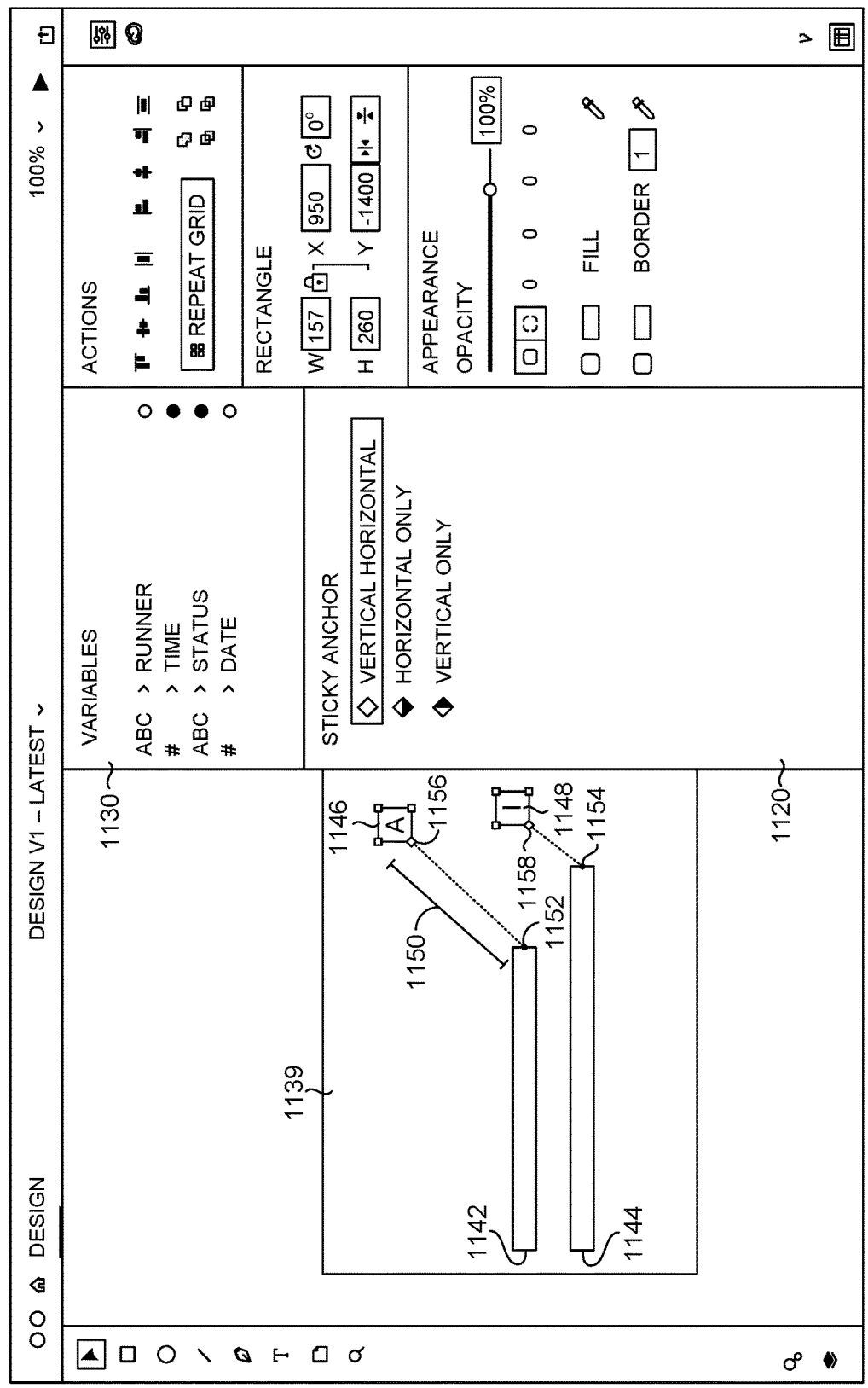

As explained, this fixed spatial relationship is a unilateral relationship such that the distance 1140 is maintained when change in position is triggered by anchors 1152 and 1154 (i.e., the "stuck" anchors), and anchors 1156 and 1158 (i.e., the "free" anchors) may be moved independently of anchors 1152 and 1154, respectively. FIG. 11D, for instance, illustrates text object 1146 having been moved upward and to the right on canvas 1139, which may have resulted from a user manually moving text object 1146. The movement of text object 1146 and, thus, anchor 1156, however, does not trigger a corresponding movement to rectangle object 1142. Accordingly, the distance 1150 between anchor 1152 of rectangle object 1142 and anchor 1156 of text object 1146 is greater than distance 1140 in FIGS. 11A-C. In exemplary aspects, the unilateral relationship between anchors 1152 and 1156 is maintained, but it is redefined with the new distance 1150. Accordingly, if a user were to later move rectangle object 1142, text object 1156 may be similarly moved so that distance 1150 between anchors 1152 and 1156 is maintained.

This unilateral relationship is useful when the position of certain objects is bound to data such that the position is subject to be changed, such as the case illustrated in FIG. 11C. When the position bound to data changes, the user likely would want to keep any related graphic objects, such as text object 1146, at the previously defined distance. Further, even when objects are not bound to data, the user may consider the position of one graphic object largely dependent on another object from a design perspective. For an example, a primary aim of the data-driven design may be to convey data tied to the rectangle objects 1142 and 1144 in FIGS. 11A-D, while text objects 1146 and 1148 may be labels or provide add secondary information. As such, the user may consider rectangle objects 1142 and 1144 as having a greater part of the overall design and, therefore, may want to experiment more with the position of rectangle objects 1142 and 1144 relative to other portions of the design while wanting text objects 1146 and 1148 to follow the movements of rectangle objects 1142 and 1144, respectively. At the same time, the user may still want the ability to adjust the distance between rectangle objects 1142 and 1144 and text objects 1146 and 1148 through the design process. The new distance between the objects resulting from independently moving text objects 1146 and 1148 re-defines the previously fixed offset relationship without needing to create a new one.

As illustrated in FIGS. 11A-C, the fixed spaced relationship is applied in both horizontal and vertical directions such that movement of rectangle object 1142 along a horizontal axis and/or vertical axis result in corresponding movement of the text object 1146. In some embodiments, however, the spaced relationship may be fixed along only a horizontal axis or vertical axis. When fixed along the horizontal axis only, a change in the X-axis position of anchor 1152 triggers a change in the X-axis position of anchor 1156 while the Y position of anchor point 1156 stays the same. Conversely, when fixed only in the vertical direction, a change in the Y-axis position of anchor 1152 triggers a change in the Y-axis position of anchor 1156 while the X-axis position of anchor 1156 does not change. In some aspects, the spaced relationship may automatically be fixed in both vertical and horizontal directions, and a user is able to select the vertical only or horizontal only options in the anchor area 1120 of the GUI environment 1100. Additionally, the type of fixed relationship may be visually indicated with one or more of the anchors, such as anchor 1156 of text object 1146. For instance, when the spaced relationship is fixed in both directions, the entire anchor 1156 is unfilled, and when the relationship is fixed in only one direction, anchor 1156 may be divided in half according to the selected direction and partially filled, as illustrated in anchor area 1120.

Although FIGS. 11A-C describe an offset relationship between objects that has at least one property bound to data, it is contemplated that this relationship may be created between graphic objects that are not subject to any data binding. The graphic objects may still be moved to maintain this spaced relationship but will not be moved automatically based on a data binding. Additionally, while anchors 152, 154, 156, and 158 of FIGS. 11A-C are positioned around the perimeter of the shapes or bounding boxes, a spaced relationship between two objects may be defined by other types of anchors, including internal anchors. Further, it is contemplated that the relationship between the two graphic objects may be defined by other user interface components aside from anchors, such as a separate graphic object ("offset object") spanning the distance between the two graphic objects. In this case, the fixed relationship is defined as the length of the offset object, rather than the distance between two anchors.

Example Operating Environment

Having described an overview of embodiments of the present invention, an exemplary operating environment in which embodiments of the present invention may be implemented is described below in order to provide a general context for various aspects of the present invention. Referring now to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes a bus 1210 that directly or indirectly couples the following devices: memory 1212, one or more processors 1214, one or more presentation components 1216, input/output (I/O) ports 1218, input/output components 1120, and an illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer-storage media in the form of volatile and/or nonvolatile memory. As depicted, memory 1212 includes instructions 1224. Instructions 1224, when executed by processor(s) 1214 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be equipped with depth cameras, such as stereoscopic camera systems, infrared camera systems, RGB camera systems, touchscreen technology, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. One or more computer storage devices storing computer-executable instructions that, when executed by a computing device, cause the computing device to perform a method, the method comprising:
   receiving a selection of a visual property of at least one graphic object of a plurality of graphic objects displayed within a canvas on a graphical user interface, the plurality of graphic objects each having a property value within a primary coordinate system for the visual property;
   receiving a selection of a variable, the variable being identified from a data set and having a plurality of variable values;
   creating a secondary coordinate system for the visual property based on the plurality of variable values for the variable, wherein the plurality of graphic objects each has a secondary property value for the visual property within the secondary coordinate system based on a variable value within the plurality of variable values;
   generating an axis control for the plurality of graphic objects based on the secondary coordinate system, the axis control comprising an axis representing the plurality of variable values and indicating a correspondence between at least one of the variable values and at least one point on the axis;
   providing the axis control for display within the graphical user interface, the axis of the axis control being displayed concurrently with and outside of the canvas;
   receiving an indication of an adjustment of the axis displayed on the graphical user interface, wherein the adjustment is one of expansion or contraction of the axis; and
   in response to receiving the indication of the adjustment of the axis, automatically adjusting property values within the coordinate system for each of the plurality of graphic objects displayed within the graphical user interface, wherein property values of the plurality of graphic objects are simultaneously adjusted in proportion to the adjustment of the axis, wherein the secondary property values of the plurality of graphic objects within the secondary coordinate system do not change upon the adjustment of the axis.

2. The one or more computer storage devices of claim 1, wherein the axis comprises a vertical axis or a horizontal axis.

3. The one or more computer storage devices of claim 2, wherein the axis control comprises a vertical axis when the visual property selected is a height of the plurality of graphic objects or a Y-axis position of at least a portion of the plurality of graphic objects.

4. The one or more computer storage devices of claim 2, wherein the axis control comprises a horizontal axis when the visual property selected is a width of the plurality of graphic objects or an X-axis position of at least a portion of the plurality of graphic objects.

5. The one or more computer storage devices of claim 1, wherein a first end of the axis represents a minimum axis value and a second end of the axis control represents a maximum axis value, wherein at least the maximum axis value is determined from a maximum variable value from the plurality of variable values.

6. The one or more storage devices of claim 5, wherein at least one of the maximum axis value and the minimum axis value is adjusted by a user.

7. The one or more storage devices of claim 1, wherein the indication of the adjustment of the axis comprises a user selecting a portion of the axis and dragging the portion of the axis within the graphical user interface.

8. The one or more storage devices of claim 1, wherein the secondary coordinate system includes an origin that is determined based on a position of the plurality of graphic objects displayed on the canvas.

9. The one or more storage devices of claim 1, wherein the plurality of variable values include a range of variable values between a maximum variable value and a minimum variable value, and wherein the axis of the axis control includes a segment representing the range of variable values that is visually distinct from the rest of the axis.

10. One or more computer storage devices storing computer-executable instructions that, when executed by a computing device, cause the computing device to perform a method, the method comprising:
   creating an association between a visual property of a plurality of graphic objects displayed on a canvas in a graphical user interface and variable values for a variable identified in a data set, wherein each of the plurality of graphic objects displayed on the graphical user interface has a property value within a primary coordinate system for the visual property, and wherein, based on the association, each of the plurality of graphic objects has a secondary property value within a secondary coordinate system for the visual property, the secondary property value being based on one of the variable values of the variable within the data set;

creating an adjustable axis control for the plurality of graphic objects based on the association between the visual property and the variable values for the variable, the axis control including an axis that represents the plurality of variable values and indicating a correspondence between at least one of the variable values and at least one point on the axis;

providing the axis control for display within the graphical user interface the axis of the axis control being displayed concurrently with and outside of the canvas;

receiving an indication of an adjustment of the axis displayed on the graphical user interface, wherein the adjustment is one of expansion or contraction of the axis; and in response to the receiving the indication of the adjustment of the axis, automatically adjusting property values within the primary coordinate system for the plurality of graphic objects being displayed on the graphical user interface, wherein the property values are simultaneously adjusted based on the indication of the adjustment of the axis, wherein the secondary property values within the secondary coordinate system for the visual property do not change upon the adjustment of the axis.

11. The one or more computer storage devices of claim 10, where the axis includes a segment representing a variable range of variable values between a maximum variable value and a minimum variable value, wherein the segment representing the variable range is visually distinct from the rest of the axis.

12. The one or more computer storage devices of claim 10, wherein the axis control is a first axis control and wherein the method further comprises:

creating a second association between a second visual property of the plurality of graphic objects and variable values for a second variable identified in the data set, wherein each of the plurality of graphic objects has a property value within a primary coordinate system for the second visual property, and wherein, based on the second association, each of the plurality of graphic objects has a secondary property value within a secondary coordinate system for the second visual property, the second property value based on one of the variable values of the second variable;

creating a second axis control for the plurality of graphic objects based on the second association, the second axis control including a second axis that represents the variable values for the second variable and indicating a correspondence between at least one of the variable values and at least one point on the second axis; and providing the second axis control for display within the graphical user interface, the second axis of the second axis control being displayed concurrently with and outside of the canvas.

13. The one or more computer storage devices of claim 12, wherein the second axis control is adjustable independently of the first axis control.

14. The one or more computer storage devices of claim 12, wherein the axis control is a horizontal axis and the second axis control is a vertical axis.

15. A computer system comprising:

a means for binding data in a data set to one or more visual properties for of a plurality of graphic objects displayed on a canvas in a graphical user interface, the data comprising variable values for a first variable, wherein a first visual property of the one or more visual properties is bound to the first variable;

a means for creating an axis control displayed on the graphical user interface, the axis control comprising an axis that is being displayed concurrently with and outside of the canvas and that represents the variable values of for the first variable, the axis control indicating a correspondence between at least one of the variable values of the first variable and at least one point on the axis of the axis control, each of the plurality of graphic objects having a property value within a primary coordinate system for the first visual property, wherein each graphic object of the plurality of graphic objects has a secondary property value within a secondary coordinate system for the first visual property, the secondary property values being based on the variable values for the first variable;

a means for receiving an indication of an adjustment of the axis displayed on the graphical user interface, wherein the adjustment is one of expansion or contraction of the axis; and a means for automatically adjusting property values within the primary coordinate system for each of the plurality of graphic objects displayed within the graphical user interface in response to the receiving the indication of the adjustment of the axis, wherein the property values of the plurality of graphic objects are simultaneously adjusted in proportion to the adjustment of the axis and the secondary property values of the plurality of graphic objects do not change upon the adjustment of the axis.

16. The computer system of claim 15, wherein the means for binding data to one or more visual properties comprises:
receiving a selection of the first visual property;
receiving a selection of the first variable identified in the data; and
associating the first visual property with the first variable.

17. The computer system of claim 16, wherein the means for creating the axis control comprises:
identifying a maximum variable value for the first variable and a minimum variable value for the first variable within the data; and
using at least the property value within the primary coordinate system of the first graphic object displayed within the graphical user interface to determine property values within the primary coordinate system corresponding to the maximum variable value and the minimum variable value, wherein the axis of the axis control extends at least between property values within the primary coordinate system that correspond to the maximum variable value and the minimum variable value.

18. The computer system of claim 17, wherein when the maximum variable value for the first variable is modified in the data, the axis is automatically updated to reflect a new maximum variable value with a new property value within the primary coordinate system.

19. The computer system of claim 16, wherein the axis control is automatically created upon association of the first visual property with the first variable, the first visual property being one of position and dimension.

* * * * *

UNITED STATES PATENT AND TRADEMARK OFFICE
CERTIFICATE OF CORRECTION

| | | |
|---|---|---|
| PATENT NO. | : 11,023,110 B2 | Page 1 of 1 |
| APPLICATION NO. | : 15/783478 | |
| DATED | : June 1, 2021 | |
| INVENTOR(S) | : Bernard James Kerr | |

It is certified that error appears in the above-identified patent and that said Letters Patent is hereby corrected as shown below:

In the Claims

In Column 30, Line 26, Claim 3, before "comprises" delete "control".

In Column 30, Line 31, Claim 4, before "comprises" delete "control".

In Column 31, Line 15, Claim 10, after "interface" insert -- , --.

In Column 31, Line 66, Claim 14, after "the axis" delete "control".

Signed and Sealed this
Seventh Day of September, 2021

Drew Hirshfeld
*Performing the Functions and Duties of the
Under Secretary of Commerce for Intellectual Property and
Director of the United States Patent and Trademark Office*